US009566786B2

(12) United States Patent
Brook et al.

(10) Patent No.: US 9,566,786 B2
(45) Date of Patent: Feb. 14, 2017

(54) DROPLET DEPOSITION APPARATUS AND METHOD FOR MANUFACTURING THE SAME

(71) Applicant: XAAR TECHNOLOGY LIMITED, Cambridgeshire (GB)

(72) Inventors: Colin Brook, Cambridgeshire (GB); Alin Ristea, Cambridgeshire (GB); Michael Walsh, Suffolk (GB); Chris Gosling, Huntingdon (GB)

(73) Assignee: XAAR TECHNOLOGY LIMITED, Cambridgeshire (GB)

( * ) Notice: Subject to any disclaimer, the term of this patent is extended or adjusted under 35 U.S.C. 154(b) by 0 days.

(21) Appl. No.: 15/038,661

(22) PCT Filed: Nov. 25, 2014

(86) PCT No.: PCT/GB2014/053497
§ 371 (c)(1),
(2) Date: May 23, 2016

(87) PCT Pub. No.: WO2015/079223
PCT Pub. Date: Jun. 4, 2015

(65) Prior Publication Data
US 2016/0288503 A1 Oct. 6, 2016

(30) Foreign Application Priority Data
Nov. 26, 2013 (GB) .................... 1320862.4

(51) Int. Cl.
*B41J 2/14* (2006.01)
(52) U.S. Cl.
CPC ... *B41J 2/14201* (2013.01); *B41J 2002/14419* (2013.01)
(58) Field of Classification Search
None
See application file for complete search history.

(56) References Cited

U.S. PATENT DOCUMENTS 6,926,382 B2 * 8/2005 Ito .................. B41J 2/14209
347/29

FOREIGN PATENT DOCUMENTS

EP    0 277 703 A1    8/1988
EP    0 278 590 A1    8/1988
(Continued)

OTHER PUBLICATIONS

Search Report and Written Opinion in International Application No. PCT/GB2014/053497 dated May 28, 2015.
(Continued)

*Primary Examiner* — Lisa M Solomon
(74) *Attorney, Agent, or Firm* — Marshall, Gerstein & Borun LLP

(57) ABSTRACT

A droplet deposition apparatus, such as an inkjet printhead, that includes an integrally-formed manifold component and one or more actuator components; these actuator components provide an first array of fluid chambers, each of which has a piezoelectric actuator element and a nozzle, with this piezoelectric actuator element being able to cause the release in a deposition direction of fluid droplets through the nozzle in response to electrical signals; the first array of fluid chambers extends in an array direction from a first longitudinal end to a second, opposite longitudinal end, this array direction being perpendicular to the deposition direction; in addition, the manifold component is elongate in the array direction and includes a first and second manifold chambers, with these manifold chambers extending side-by-side in the array direction and the first manifold chamber being fluidically connected to the second manifold chamber via each of the fluid chambers in the first array; the cross-sectional area of at least one of these manifold chambers is tapered with distance in the array direction, for example to improve purging of the chambers during start-up; the cross-sectional
(Continued)

shape of the integrally-formed manifold component perpendicular to the array direction varies with distance in the array direction such that the centroid of the cross-section remains a substantially constant distance, in said deposition direction, from said array of fluid chambers over the length of the first array of fluid chambers, with the integrally-formed manifold component thus being essentially self-stiffening.

18 Claims, 17 Drawing Sheets

(56) References Cited

FOREIGN PATENT DOCUMENTS

| EP | 0376532 A1 | 7/1990 |
|---|---|---|
| WO | WO-98/52763 A2 | 11/1998 |
| WO | WO-9919147 A1 | 4/1999 |
| WO | WO-0024584 A1 | 5/2000 |
| WO | WO-0038928 A1 | 7/2000 |
| WO | WO-0112442 A2 | 2/2001 |
| WO | WO-2007113554 A2 | 10/2007 |
| WO | WO-2010029974 A1 | 3/2010 |

OTHER PUBLICATIONS

International Preliminary Report on Patentability in International Application No. PCT/GB2014/053497 dated Oct. 22, 2015.

* cited by examiner

DROPLET DEPOSITION APPARATUS AND METHOD FOR MANUFACTURING THE SAME

The present invention relates to droplet deposition apparatus. It may find particularly beneficial application in a drop-on-demand ink-jet printhead, or, more generally, in droplet deposition apparatus and, specifically, in droplet deposition apparatus comprising a manifold component and one or more actuator components, the actuator components providing an array of fluid chambers, which each have a piezoelectric actuator element and a nozzle, the piezoelectric actuator element being operable to cause the release in a deposition direction of fluid droplets through the nozzle in response to electrical signals, where the manifold component includes a first manifold chamber and a second manifold chamber, the first manifold chamber being fluidically connected to said second manifold chamber via each of said fluid chambers in said first array.

Those skilled in the art will appreciate that a variety of alternative fluids may be deposited by droplet deposition apparatus: droplets of ink may travel to, for example, a paper or other substrate, such as ceramic tiling, to form an image, as is the case in inkjet printing applications; alternatively, droplets of fluid may be used to build structures, for example electrically active fluids may be deposited onto a substrate such as a circuit board so as to enable prototyping of electrical devices, or polymer containing fluids or molten polymer may be deposited in successive layers so as to produce a prototype model of an object (as in 3D printing). Droplet deposition apparatus suitable for such alternative fluids may be provided with modules that are similar in construction to standard inkjet printheads, with some adaptations made to handle the specific fluid in question.

In addition, a wide variety of constructions exist within the prior art for droplet deposition, including a number that have been disclosed by the present Applicant. Of particular interest in the present case are the examples provided by WO 00/38928, from which FIGS. 1, 2, 3, 4 and 7 are taken.

WO 00/38928 provides a number of examples of droplet deposition apparatus having an array of fluid chambers, with each chamber communicating with an orifice for droplet ejection, with a common fluid inlet manifold and with a common fluid outlet manifold and where there is, during use, a fluid flow into the inlet manifold, through each chamber in the array and into the outlet manifold.

FIG. 1 illustrates a "pagewide" printhead 10, having two rows of nozzles 20, 30 that extend (in the direction indicated by arrow 100) the width of a piece of paper and which allow ink to be deposited across the entire width of a page in a single pass. Ejection of ink from a nozzle is achieved by the application of an electrical signal to actuation means associated with a fluid chamber communicating with that nozzle, as is known e.g. from EP-A-0 277 703, EP-A-0 278 590, WO 98/52763 and WO 99/19147.

More particularly, as taught in EP-A-0 277 703 and EP-A-0 278 590, piezoelectric actuator walls may be formed between successive channels and are actuated by means of electric fields applied between electrodes on opposite sides of each wall so as to deflect transversely in shear mode. The resulting pressure waves generated in the ink or other fluid cause ejection of a droplet from the nozzle.

To simplify manufacture and increase yield, the "pagewide" row(s) of nozzles may be made up of a number of modules, one of which is shown at 40, each module having associated fluid chambers and actuation means and being connected to associated drive circuitry (integrated circuit ("chip") 50) by means e.g. of a flexible circuit 60. Ink supply to and from the printhead is via respective bores (not shown) in end-caps 90.

FIG. 2 is a perspective view of the printhead of FIG. 1 from the rear and with end-caps 90 removed to reveal the supporting structure 200 of the printhead incorporating ink flow passages, or manifolds 210,220,230 extending the width of the printhead.

WO 00/38928 teaches that ink may be fed into an inlet manifold and out of an outlet manifold, with the manifolds being common to and connected via each channel, so as to generate ink flow through each channel (and thus past each nozzle) during printhead operation. This may act to prevent the accumulation of dust, dried ink or other foreign bodies in the nozzle that would otherwise inhibit ink droplet ejection.

In more detail, ink enters the printhead of FIGS. 1 to 4 via a bore in one of the end-caps 90 (omitted from the views of FIGS. 1 and 2), and via the inlet manifold 220, as shown at 215 in FIG. 2. As it flows along the inlet manifold 220, it is drawn off into respective ink chambers, as illustrated in FIG. 3, which is a sectional view of the printhead taken perpendicular to the direction of extension of the nozzle rows. From inlet manifold 220, ink flows into first and second parallel rows of ink chambers (indicated at 300 and 310 respectively) via aperture 320 formed in structure 200 (shown shaded). Having flowed through the first and second rows of ink chambers, ink exits via apertures 330 and 340 to join the ink flow along respective first and second ink outlet passages 210,230, as indicated at 235. These join at a common ink outlet bore (not shown) formed in the end-cap and that may be located at the opposite or same end of the printhead to that in which the inlet bore is formed.

Each row of chambers 300 and 310 has associated therewith respective drive circuits 360,370. The drive circuits are mounted in substantial thermal contact with that part of structure 200 acting as a conduit and which defines the ink flow passageways so as to allow a substantial amount of the heat generated by the circuits during their operation to transfer via the conduit structure to the ink. To this end, the structure 200 is made of a material having good thermal conduction properties. WO 00/38928 teaches that aluminum is a particularly preferred material, on the grounds that it can be easily and cheaply formed by extrusion. Circuits 360,370 are then positioned on the outside surface of the structure 200 so as to lie in thermal contact with the structure, thermally conductive pads or adhesive being optionally employed to reduce resistance to heat transfer between circuit and structure.

In order to reinforce the support structure 200, a bar made from a strong material, such as steel, may be provided within channel 550 (as is known from WO 00/2584).

Further detail of the chambers and nozzles of the particular printhead shown in FIGS. 1 to 3 is given in FIG. 4, which is a sectional view taken along a fluid chamber of a module 40. As shown in FIG. 4, channels 11 are machined or otherwise formed in a base component 860 of piezoelectric material so as to define piezoelectric channel walls which are subsequently coated with electrodes, thereby to form channel wall actuators, as known e.g. from EP-A-0 277 703. Each channel half is closed along a length 600,610 by respective sections 820,830 of a cover component 620 which is also formed with ports 630,640,650 that communicate with fluid manifolds 210,220,230 respectively. Each half 600,610 of the channel 11 thus provides one fluid chamber.

A break in the electrodes at 810 allows the channel walls in either half of the channel to be operated independently by means of electrical signals applied via electrical inputs (flexible circuits 60). Ink ejection from each channel half is via openings 840,850 that communicate the channel with the opposite surface of the piezoelectric base component to that in which the channel is formed. Nozzles 870,880 for ink ejection are subsequently formed in a nozzle plate 890 attached to the piezoelectric component.

The large arrows in FIG. 4 illustrate (from left to right): the flow of fluid from the chambers on the left-hand-side of the array 600 to outlet manifold 210, via the left-hand port 630; the flow of fluid into the channels from inlet manifold 220, via the central port 640; and the flow of fluid from the chambers on the right-hand-side of the array 610 to the other outlet manifold 230, via the right-hand port 650.

As a result, it will be appreciated that there is, during use of the printhead, a flow of fluid along the length of each of the chambers 600,610. As noted above, WO 00/38928 teaches that this ink flow through each channel (and thus past each nozzle) during printhead operation may act to prevent the accumulation of dust, dried ink or other foreign bodies in the nozzle that would otherwise inhibit ink droplet ejection. More, WO 00/38928 teaches that, to ensure effective cleaning of the chambers by the circulating ink and in particular to ensure that any foreign bodies in the ink, e. g. dirt particles, are likely to go past a nozzle rather than into it, the ink flow rate through a chamber must be higher than the maximum rate of ink ejection from the chamber and may, in some cases, be ten times that rate.

FIGS. 5 and 6 are exploded perspective views (taken from WO 01/12442) of a printhead having similar features as that shown in FIGS. 1 to 4. Thus, WO 01/12442 provides further examples of droplet deposition apparatus having an array of fluid chambers, with each chamber communicating with an orifice for droplet ejection, with a common fluid inlet manifold and with a common fluid outlet manifold and where there is, during use, a fluid flow into the inlet manifold, through each chamber in the array and into the outlet manifold.

FIGS. 5 and 6 illustrate in detail how various components may be arranged on a substrate 86, together with constructional details of the substrate 86 itself.

In more detail, FIGS. 5 and 6 illustrate two rows of channels spaced relative to one another in the media feed direction. The two rows of channels are formed in respective strips of piezoelectric material 110a, 110b, which are bonded to a planar surface of substrate 86. Each row of channels extends the width of a page in a direction transverse to the media feed direction. As discussed above, electrodes are provided on the walls of the channels, so that electrical signals may be selectively applied to the walls. The channel walls may thus act as actuator members that can cause droplet ejection.

Substrate 86 is formed with conductive tracks 192, which are electrically connected to the respective channel wall electrodes, (for example by solder bonds), and which extend to the edge of the substrate where respective drive circuitry (integrated circuits 84) for each row of channels is located.

As may also be seen from FIGS. 5 and 6, a cover member 420 is bonded to the tops of the channel walls so as to create closed, "active" channel lengths which may contain pressure waves that allow for droplet ejection. Holes are formed in cover member 420 that communicate with the channels to enable ejection of droplets. These holes in turn communicate with nozzles (not shown) formed in a nozzle plate 430 attached to the planar cover member 420. However, it is also known, for example from WO 2007/113554, to use an appropriately constructed nozzle plate in place of such a combination of a cover member and nozzle plate.

As with the construction described with reference to FIGS. 1 to 4, the substrate 86 is provided with ports 88, 90 and 92, which communicate to inlet and outlet manifolds. The inlet manifold may be provided between two outlet manifolds, with the inlet manifold thus supplying ink to the channels via port 90, and ink being removed from the two rows of channels to respective outlet manifolds via ports 88 and 92. As FIG. 6 illustrates, the conductive tracks 192 may be diverted around the ports 88, 90 and 92.

It is known from WO 00/38928 for the cross-sectional area of the manifolds to taper with increasing distance in the direction of the array. The arrangements discussed in WO 00/38928 are intended to be applied to printheads in which the linear array of droplet fluid chambers is arranged at a non-zero angle to the horizontal direction. Accordingly, the taper results, in each manifold, in the viscous pressure drop per length down the array being balanced against the gravitational increase in pressure. This is achieved by arranging that the cross-section available for flow at each point is appropriate to the flow there.

FIG. 7, which is taken from WO 00/38928, schematically illustrates an arrangement where a linear array of droplet fluid chambers of similar construction to that discussed with reference to FIGS. 1 to 6 is arranged at a non-zero angle to the horizontal direction (i. e. at a non-perpendicular angle to the direction of gravity, indicated by arrow X in the figure). For the sake of clarity, only a single linear array of chambers is depicted by arrows 1000. However, the constructions disclosed in WO 00/38928 utilize an arrangement having a single inlet manifold 1010 and double outlet manifolds 1020, as shown in FIGS. 1-4. Manifolds 1010,1020 are supplied with and drained of ink at connections 1030 and 1040 respectively.

More particularly, as shown in FIG. 7, inserts 1050 and 1060 having a tapered shape are respectively placed in inlet 1010 and outlet 1020 manifolds, which have a generally constant rectangular cross-section. As a result, the ink entering the inlet manifold 1010 at the top of the array finds that the tapered insert 1050 only blocks part of the cross-section of the manifold. As the ink passes down the inlet manifold 1010, some of it flows outwards via the fluid chambers 1000 to the outlet manifold 1020 such that, by the time the bottom of the array is reached, there is no ink flowing in the inlet manifold 1010 and the tapered insert 1050 leaves no cross-section for flow. Ink reaching the outlet manifold 1020 also flows downwards, via cross-sections which increase towards the bottom by virtue of further tapered inserts 1060. By the bottom of the array, all the ink (except that which has been ejected for printing) is flowing in the large space allowed by the inserts.

Although the arrangements discussed in WO 00/38928 are intended to be applied to printheads in which the linear array of droplet fluid chambers is arranged at a non-zero angle to the horizontal direction, so as to balance the decrease in viscous pressure against the increase in gravitational pressure along the array, there may be a number of reasons for providing a taper within the manifolds.

In particular, providing a taper within the manifolds may assist with purging of the fluid chambers as part of a start-up mode for the apparatus. For example, the taper may ensure a roughly equal amount of fluid flow passes through each of the chambers in the array. This may, for example, reduce the likelihood of bubbles being trapped at the end of the array furthest from the point where enters the manifold. In order to provide such functionality, the direction of the taper in the inlet and outlet manifolds may be broadly similar to that shown in FIG. 7, though it will of course be appreciated that the different purpose for the taper will significantly impact upon the exact rate at which the cross-sectional area tapers with respect to distance in the array direction.

In droplet deposition apparatus it is generally desirable to improve the uniformity over the length of the array of the droplets deposited; this is particularly the case with droplet deposition apparatus that have a large array of fluid chambers, such as inkjet printers. Where a substrate is indexed past the array of fluid chambers to produce a pattern of droplets on the substrate (for example forming an image on a sheet of paper or a ceramic tile) such non-uniformity over the length of the array may be particularly visible, since it will produce generally linear defects extending in the direction of substrate movement, the human eye being particularly adept at identifying such linear features.

However, even where the pattern formed is not intended to be viewed by the human eye (such as where electrically active fluids are deposited onto a substrate such as a circuit board so as to enable prototyping of electrical devices, or polymer containing fluids or molten polymer may be deposited in successive layers so as to produce a prototype model (so-called 3D printing)), or where the substrate is not indexed past the array, it will still be appreciated that non-uniformity over the length of the array will be a concern.

There are numerous factors that are thought to cause non-uniformity of deposited droplets, with the interactions between these factors complex and often difficult to predict.

Embodiments of the present invention are intended to provide apparatus that may form part of an improved droplet deposition apparatus having an array of fluid chambers, with each chamber communicating with an orifice for droplet ejection, with a common fluid inlet manifold and with a common fluid outlet manifold and where there is, during use, a fluid flow into the inlet manifold, through each chamber in the array and into the outlet manifold. For example, apparatus according to the present invention may provide one or more component parts for such an improved droplet deposition apparatus having an array of fluid chambers, with each chamber communicating with an orifice for droplet ejection, with a common fluid inlet manifold and with a common fluid outlet manifold and where there is, during use, a fluid flow into the inlet manifold, through each chamber in the array and into the outlet manifold. In particular, such droplet deposition apparatus may, because of the use of apparatus according to embodiments of the present invention, exhibit improved uniformity in droplet deposition over the array of fluid chambers. However, it should be noted that further and/or other advantages may stem from embodiments of the present invention.

Thus, in accordance with a first aspect of the present invention there is provided droplet deposition apparatus comprising an integrally-formed manifold component and one or more actuator components; wherein said one or more actuator components provide an first array of fluid chambers, each having a piezoelectric actuator element and a nozzle, said piezoelectric actuator element being operable to cause the release in a deposition direction of fluid droplets through said nozzle in response to electrical signals, said first array of fluid chambers extending in said array direction from a first longitudinal end to a second, opposite longitudinal end, said array direction being generally perpendicular to said deposition direction; wherein the manifold component is elongate in said array direction and comprises a first manifold chamber and a second manifold chamber, said first and second manifold chambers extending side-by-side in said array direction and said first manifold chamber being fluidically connected to said second manifold chamber via each of said fluid chambers in said first array; wherein the cross-sectional area of at least one of said first manifold chamber and said second manifold chamber tapers with distance in the array direction; and wherein the cross-sectional shape of said manifold component perpendicular to said array direction varies with distance in the array direction such that the centroid of the cross-section remains a substantially constant distance, in said deposition direction, from said array of fluid chambers over the length of the first array of fluid chambers.

The Applicant has identified mechanical stress within droplet deposition apparatus and, more particularly in the components near to the array of fluid chambers, as a significant cause of non-uniformity. In particular, it has been found that, in constructions similar to that shown in FIG. 7, a significant source of such mechanical stress within the apparatus may be the tapering of the inlet and/or outlet manifolds. Such tapering leads to a variation in the stiffness of the apparatus over the length of the array, since, viewed in cross-section, the amount of material surrounding the manifolds varies over the length of the array. This variation in stiffness may lead to stress within the apparatus over the length of the array and thus may impact upon the uniformity over the length of the array of the droplets deposited.

According to the present invention, the cross-sectional shape of the manifold component varies with distance in the array direction such that the centroid of the cross-section remains a substantially constant distance from said mounting surface. This may reduce the variation in stiffness over the length of the array and thus may improve the uniformity of the droplets deposited by the array.

It may be noted that constructions within the prior art have made some efforts to increase stiffness over the length of the actuator array. For example, as noted above, WO 00/24584, teaches that a bar made from a strong material, such as steel, may be provided within channel 550 of the construction shown in FIGS. 1 to 4 so as to reinforce the support structure 200.

In addition, WO 00/24584 discusses the bowing of the aluminum supporting structure 200 as a result of its thermal expansion during use. To address such bowing, WO 00/24584 teaches that an alumina plate is mounted to the underside of the supporting structure in order to limit expansion of the aluminum, thereby substantially preventing bowing of the structure due to thermal expansion.

Furthermore, WO 00/2584 teaches that tie rods may be inserted in bores extending the length of the supporting structure 200, with the tie rods being tightened so as to keep structure 200 in compression.

However, it has been found that such approaches have drawbacks and, moreover, still lead to significant mechanical stress, with an attendant lack of uniformity over the length of the array of the droplets deposited.

More particularly, it is believed that, in the approaches where different materials are used to stiffen the support (such as where a steel bar is disposed within channel 550 of the aluminum supporting structure, or an alumina plate is mounted to the underside of the aluminum supporting structure) the different coefficients of thermal expansion for these materials, which causes the different elements to expand at different rates, will tend to induce stress within the structure during use. This stress may lead an unacceptable lack of uniformity over the length of the actuator array in the droplets deposited The provision of tie rods to keep the structure in compression during use directly imposes stress on the supporting structure. Again, this stress may cause an unacceptable lack of uniformity over the length of the actuator array in the droplets deposited.

By contrast, it will be appreciated that apparatus according to the present invention comprises a manifold component that may be considered essentially self-stiffening. As a result, the need for further stiffening components may not arise, which may thus avoid the drawbacks noted above, such as the additional stress caused by such components. In addition, the apparatus may be more easily and cheaply manufactured as fewer assembly steps may be required without such additional stiffening components. Further benefits in terms of ease and cost of manufacture may arise as a result of the manifold component being integrally-formed.

Suitably, the distance, in said deposition direction, between the centroid of said cross-section of the manifold component and the first array of fluid chambers may vary by no more than 10% over the length of the first array of fluid chambers, preferably by no more than 5%, and still more preferably by no more than 2%.

Controlling the position of the centroid of the cross-section with respect to a manifold width direction, which is normal to said deposition direction and said deposition direction, may also be important. Thus, the cross-sectional shape of the manifold component perpendicular to said array direction may vary with distance in the array direction such that the centroid of the cross-section remains at substantially the same location over the length of the first array of fluid chambers with respect to a manifold width direction, which is normal to said deposition direction and said deposition direction, and preferably the location with respect to said manifold width direction varies by no more than 10% of the width of the manifold component over the length of the first array of fluid chambers, still more preferably by no more than 5%, and even more preferably by no more than 2%.

It should be noted here that the Applicant has identified further approaches to reducing the variation in stress within components near to the array of fluid chambers and thereby or otherwise improving the uniformity over the length of the actuator array of the droplets deposited.

Therefore, according to a second aspect of the present invention there is provided droplet deposition apparatus comprising an integrally-formed manifold component and one or more actuator components; wherein said one or more actuator components provide a first array of fluid chambers, each fluid chamber having a piezoelectric actuator element and a nozzle, said piezoelectric actuator element being operable to cause the release in a deposition direction of fluid droplets through said nozzle in response to electrical signals, said array of fluid chambers extending in said array direction from a first longitudinal end to a second, opposite longitudinal end, said array direction being generally perpendicular to said deposition direction; wherein the manifold component is elongate in said array direction and comprises a first manifold chamber and a second manifold chamber, said first and second manifold chambers extending side-by-side in said array direction and said first manifold chamber being fluidically connected to said second manifold chamber via each of said fluid chambers in said first array; wherein, with respect to said array direction, at least one of said manifold chambers extends beyond at least one of said first and second longitudinal ends of said first array of fluid chambers.

The Applicant has found, through analyzing the stresses present in a manifold component adjacent the array of fluid chambers, that the greatest change in stress occurs in the portions adjacent the longitudinal ends of the manifold chambers. In droplet deposition apparatus according to the second aspect of the present invention, since at least one of the manifold chambers extends beyond at least one of the first and second longitudinal ends of the first array of fluid chambers, at least some of this variation in stress may be avoided, which may thus lead to improved uniformity in deposition over the length of the array of fluid chambers.

According to a third aspect of the present invention there is provided droplet deposition apparatus comprising an integrally-formed manifold component and one or more actuator components; wherein said one or more actuator components provide first and second arrays of fluid chambers, each fluid chamber having a piezoelectric actuator element and a nozzle, said piezoelectric actuator element being operable to cause the release in a deposition direction of fluid droplets through said nozzle in response to electrical signals, said arrays of fluid chambers extending side-by side in said array direction from a respective first longitudinal end to a respective second, opposite longitudinal end, said array direction being generally perpendicular to said deposition direction; wherein the manifold component is elongate in said array direction and comprises first, second and third manifold chambers, said manifold chambers extending side-by-side in said array direction, said first manifold chamber being disposed between said second and third manifold chambers; wherein said first manifold chamber is fluidically connected to said second manifold chamber via each of the fluid chambers in said first array and to said third manifold chamber via each of the fluid chambers in said second array; wherein said manifold component further comprises first, second and third conduits, said first conduit branching into said second and third conduits at a fluid junction, said second and third conduits being connected respectively to said second and third manifold chambers; and wherein, when viewed in said deposition direction, at least a portion of said fluid junction overlaps with said first manifold chamber.

By providing an integrally-formed manifold component with such a fluid junction which, when viewed in the deposition direction, overlaps with the first manifold chamber, the footprint of the apparatus over the substrate during use may be reduced and the apparatus may be more easily manufactured. In addition, as the junction may be spaced-apart from the array of fluid chambers by the first manifold chamber, the change in cross-sectional area of the manifold component with respect to the array direction that results from the junction may have less effect on the stresses experienced adjacent the array of fluid chambers. As a result, the properties of droplets deposited by fluid chambers below the junction may not differ substantially from those of droplets deposited by fluid chambers elsewhere in the array.

Preferably, the conduits and the junction are generally located, with respect to said array direction, beyond a longitudinal end of said first and second arrays of fluid chambers. This may ensure that the junction is spaced-apart still further from the fluid chambers, further lessening its effect on variations in stress within the manifold component and thus deposition properties.

Embodiments may further comprise a fluid-flow component, with the manifold component and the fluid-flow component together providing the fluid junction. It may be preferred that this fluid-flow component is shaped generally as a plug that is shaped to be received within a corresponding socket provided by the manifold component, and more specifically that the fluid-flow component is integrally formed. Such features may further reduce the cost of and simplify manufacture of the apparatus.

Suitably, the manifold component may be substantially symmetric about a plane defined by said array and deposition directions. This may ensure that droplets deposited by one array do not differ substantially from droplets deposited by the other array. An Integrally-formed manifold component according to the present invention may be formed by molding and, preferably, by injection molding. Hence, or otherwise, the manifold component may be substantially homogenous and/or be formed of substantially the same materials throughout. In addition, or otherwise, the manifold component may be free from mechanical joints.

According to the present invention there is also provided a method of manufacturing a droplet deposition apparatus, comprising molding, and preferably injection molding, the manifold component according to any preceding claim and assembling said manifold component with said one or more actuator components.

The present invention will now be described with reference to the accompanying drawings, in which.

Figure 8:
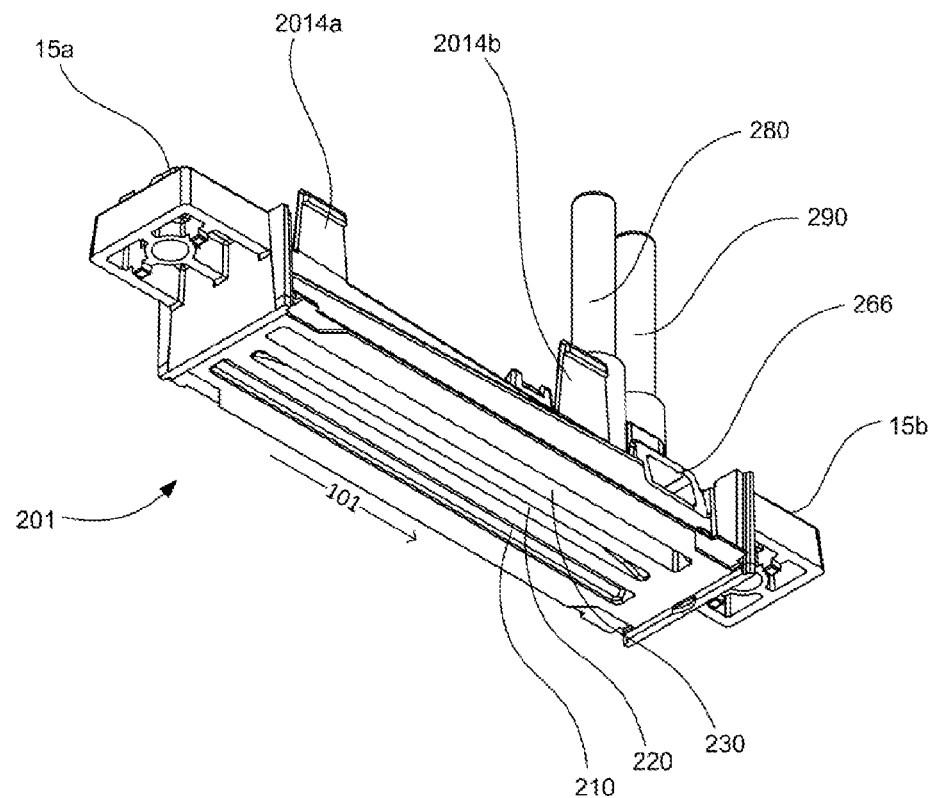
FIG. 8 is a perspective view of a manifold component for an inkjet printhead according to an embodiment of the present invention.

The present invention may be embodied in one or more components of a printhead and, more specifically, an inkjet printhead. FIG. 8 shows a manifold component 201 for an inkjet printhead according to an embodiment of the present invention. The manifold component 201 may be manufactured by injection-moulding, thus producing an integrally-formed component. This may make manufacture of the printhead significantly cheaper and easier, not least because one integrally-formed manifold component 201 may perform the functions of several of the components provided within the constructions taught by WO 00/38928 or WO 00/24584.

The manifold component may therefore be formed substantially from polymeric materials and/or plastic materials. Suitable materials may include injectable thermoplastics, of which a number of examples are known, such as polystyrene or polyethylene. However, injectable thermosetting materials may also be appropriate in some circumstances. In addition, the use of filled polymeric materials may be desirable in some cases owing to their generally greater mechanical strength and thermal resistance.

As may be seen from FIG. 8, manifold component 201 is generally elongate in an array direction (which is indicated by arrow 101 in the drawings) and includes three manifold chambers 210, 220, 230, which are formed in a bottom surface thereof. The manifold chambers 210, 220, 230 are also elongate in the array direction 101 and open along their lengths to the bottom surface of the manifold component 201. The bottom, or mounting surface is shaped so as to receive a number of actuator components, which are bonded or otherwise attached to the manifold component 201 during manufacture of the inkjet printhead.

Figure 9:
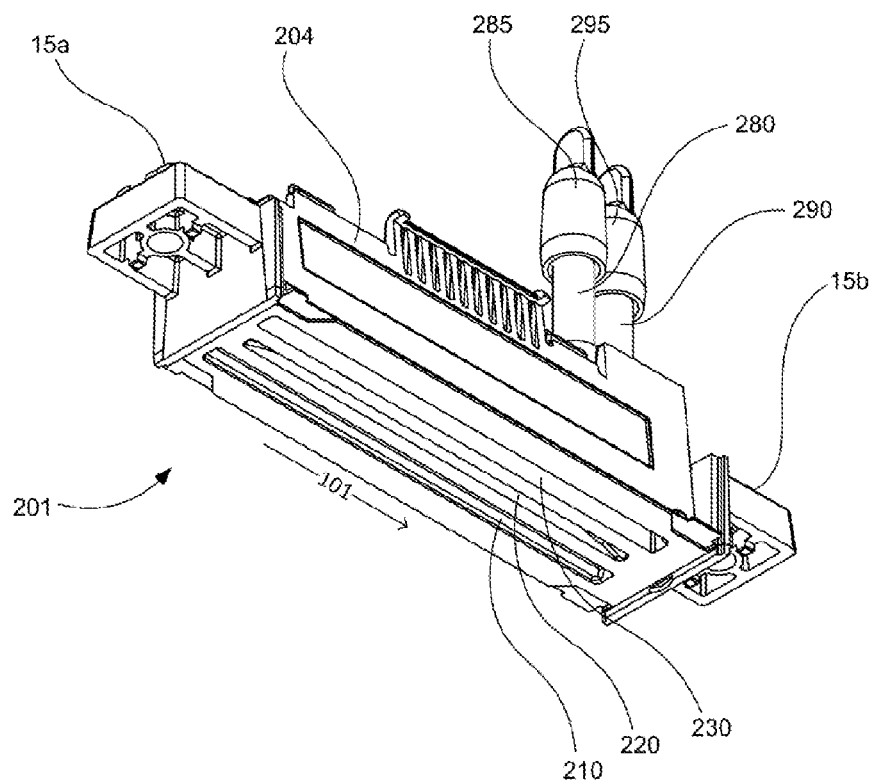
FIG. 9 is a perspective view of the manifold component of FIG. 8 with a heat-sink component loosely attached thereto.

FIG. 9 is a perspective view of the manifold component 201 illustrated in FIG. 8 with a heat-sink component 204 loosely attached thereto. The heat-sink 204 may be formed of a metallic material. In addition, respective caps 285, 295 have been provided for the two fluid supply pipes 280, 290 shown in FIGS. 8 and 9. The heat-sink 204 engages with the opposite side of the manifold component 201 to the manifold chambers 210, 220, 230.

The attachment may be by means of inserting heatsink engaging portions 2014a, 2014b provided by the manifold component (and which may be formed as an integral part of the manifold component 201 during the molding process) into corresponding apertures (not shown) in the heatsink 204. The heatsink engaging portions 2014a, 2014b may snap over an integrally-formed feature of the heatsink 204, such as a rib or ridge, so as to generally loosely secure the heatsink 204 and manifold component 201 together. Further apertures corresponding to two fluid supply pipes 280, 290 may also be provided in the heatsink 204. The detail of the exact configuration of the engagement will be discussed further below, save to note here that the heat-sink 204 may be loosely attached to the manifold component 201, such that it substantially does not transfer mechanical stress to the manifold component 201 during use.

Figure 10:
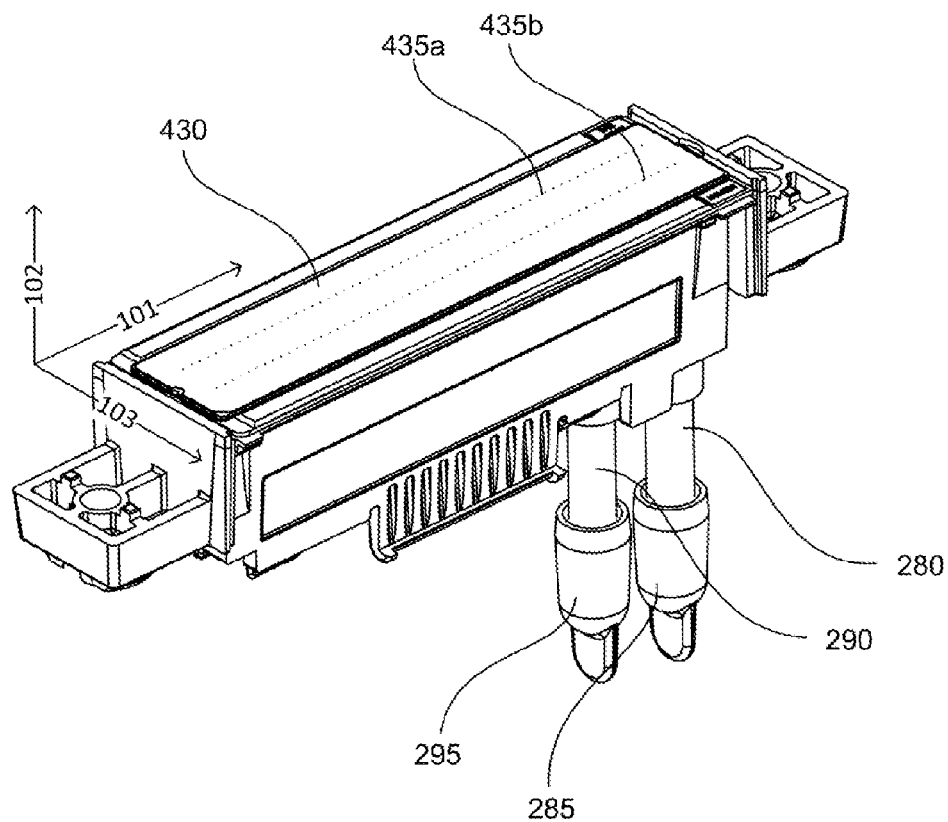
FIG. 10 shows the manifold component of FIG. 8 with actuator components attached to the mounting surface thereof and with the heat-sink of FIG. 9 attached thereto.

FIG. 10 illustrates a perspective view of the manifold component 201 with the actuator components having been attached to the mounting surface thereof and the heatsink loosely attached to the opposite side of the manifold component 201 to the mounting surface, as discussed with reference to FIG. 9. In the drawing, only the outermost of the actuator components, the nozzle plate 430, is visible. Provided within the nozzle plate 430 are two arrays of nozzles 435*a*, 435*b*, which, as shown in FIG. 10, extend generally in the array direction 101. Each array of nozzles 435*a*, 435*b* corresponds to an array of fluid chambers that are located beneath the nozzle plate 430, with each array of fluid chambers also extending in the array direction 101.

Those skilled in the art will of course appreciate that, while generally linear arrays of nozzles are depicted, there may be small offsets in the locations of nozzles within the same array, for example to take account of actuation schemes where fluid chambers are cyclically assigned to groups, as is known from EP-A-0 376 532.

The actuator components are operable, during use of the completed printhead, to eject droplets of ink (or other suitable fluid) from each of the fluid chambers through a corresponding one of the nozzles 435*a*, 435*b* in a deposition direction 102, which is generally perpendicular to the array direction 101. As may also be seen from FIG. 10, the two arrays of nozzles 435*a*, 435*b* are offset, one from the other, in a manifold width direction 103, which extends generally perpendicular to both the array direction 101 and the deposition direction 102. The nozzle plate may be generally planar, extending in a plane normal to the deposition direction 102.

Figure 11:
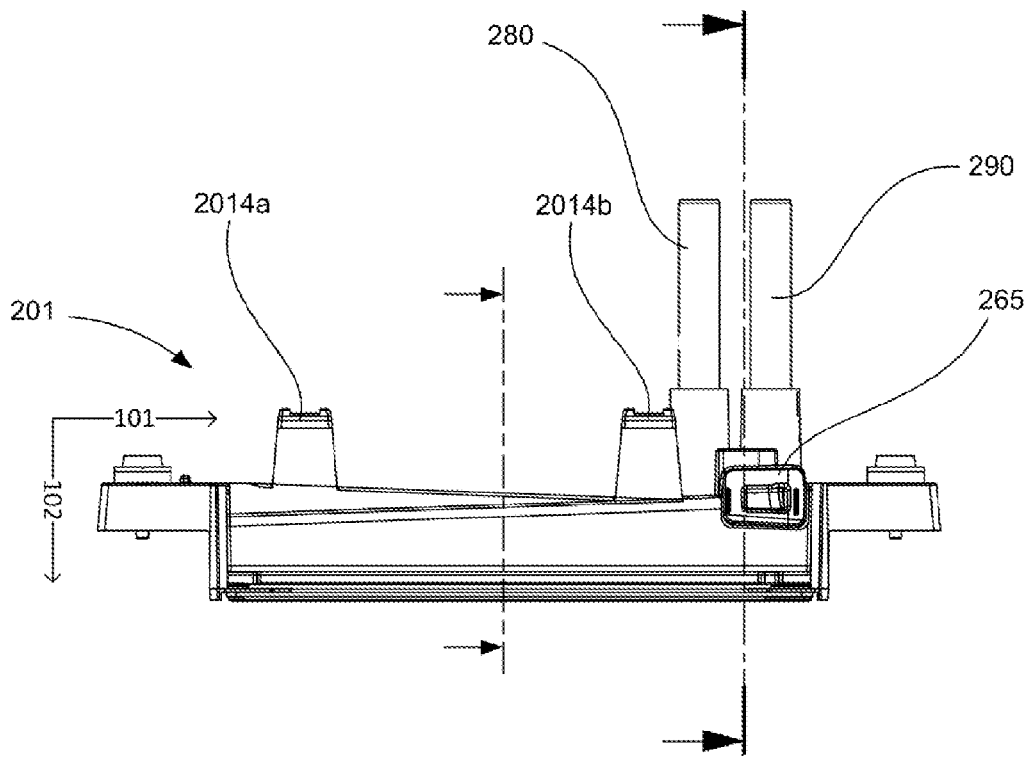
FIG. 11 is a side view of the manifold component of FIG. 8, indicating the location of the cross-sectional views shown in FIGS. 12 and 13.

FIG. 11 is a side view of the manifold component 201 (without heatsink 204), illustrating the location of two cross-sections through the manifold component 201 that are taken perpendicular to the array direction 101. The first of the two cross-sectional views is taken roughly half-way along the length of the manifold component 201 and is displayed in FIG. 12; the second is taken towards an end of the manifold component 201, where two fluid supply pipes 280, 290 are provided, and is displayed in FIG. 13.

Figure 12:
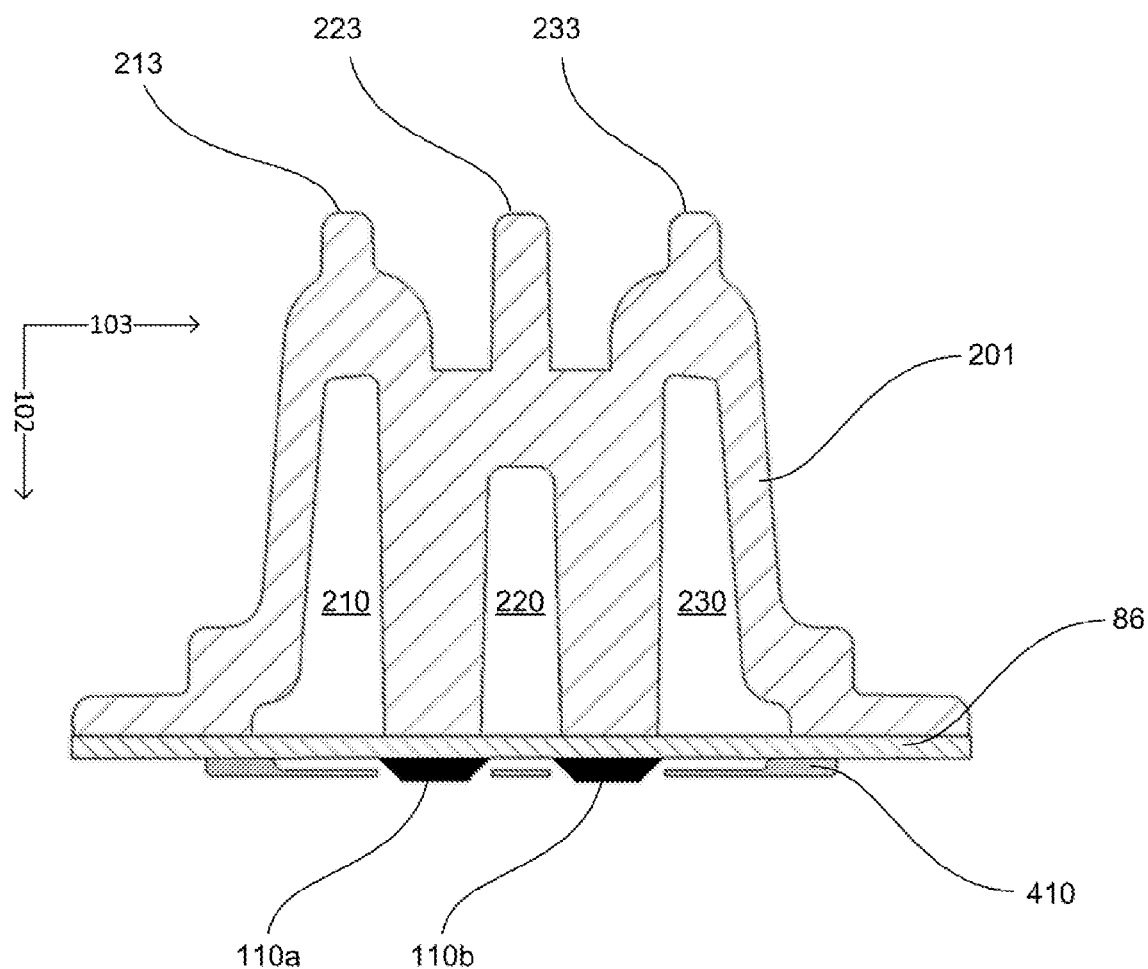
FIG. 12 is a cross-sectional view of the manifold component of FIG. 8, which illustrates the shape of manifold chambers formed in the manifold component and the arrangement of actuator components attached to the manifold component.

Attention is first directed to the cross-section shown in FIG. 12, which shows the cross-sectional shapes of the manifold chambers 210, 220, 230 formed within the manifold component 201.

As may be seen from FIG. 12, the manifold chambers 210, 220, 230 are generally disposed side-by-side, with the central manifold chamber 220 located between the left-hand manifold chamber 210 and the right-hand manifold chamber 230 (or, put differently, the central manifold chamber 220 separating left-hand manifold chamber 210 from the right-hand manifold chamber 230). Viewed in the array direction 101 (as in FIG. 12) each of the manifold chambers 210, 220, 230 is generally elongate in the deposition direction 102, the width of each chamber in the manifold width direction 103 being substantially smaller than the height in the deposition direction 102. Such elongate manifold chambers may reduce the overall width of the manifold component 201 in the manifold width direction 103, which may thus reduce the footprint of the printhead over the substrate and/or may allow the arrays of fluid chambers to be mounted closer together.

As may also be seen from FIG. 12, above each of the chambers 210, 220, 230 there is provided a respective rib 213, 223, 233, which is integrally-formed in the manifold component. These ribs assist in stiffening the manifold component 201 over its length. More particularly, the ribs 213, 223, 233 vary in shape with distance in the array direction 101, so that they ensure that the manifold component has a roughly constant stiffness over the length of the arrays of fluid chambers.

As may be apparent from the side view of the manifold component 201 in FIG. 11, the height of the manifold chambers 210, 220, 230 may taper with distance in the array direction 101, so that the cross-sectional area presented perpendicular to the array direction varies with distance in the array direction 101. As noted above, this taper in cross-sectional area may have a variety of uses, such as improving the priming of the printhead during a start-up mode, or allowing the printhead to operate more effectively when disposed at an angle to the horizontal. However, such a taper in cross-sectional area may tend to make the end of the manifold component 201 where the manifold chambers have largest cross-sections relatively less stiff and the end where the manifold chambers have smallest cross-sections relatively more stiff. This variation in stiffness over the length of the manifold component is found to have a marked effect on the uniformity of the droplets deposited by the array of fluid chambers: the stiffness profile may tend to "print through" into the pattern of droplets deposited.

In prior art manifold structures, such as those taught by WO 00/38928 or WO 00/24584, elements may be provided that generally stiffen the structure, such as metal bars, alumina strips, or tie bars; however, these will tend to nonetheless induce stresses within the manifold structure, either directly (as with the tie bars) or indirectly as a result of the different thermal expansion coefficients of the stiffening element and the manifold structure. In addition, the provision of additional structural elements to stiffen the manifold structure make the manufacture of the printhead more costly and more complex, especially when compared to a single integrally-formed manifold component 201 as provided by the present invention.

It may further be noted that the goal in such prior art structures is to generally increase the absolute rigidity of the structure, rather than to ensure equal rigidity or stiffness over the length of the array of fluid chambers. Thus, certain embodiments of the present invention may not necessarily have equal stiffness to prior art structures that include additional stiffening components. However, it is considered that the absolute value of the stiffness of the manifold structure may be of less importance than the amount of variation in stiffness over the length of the array, since, as noted above, the pattern of the variation in stiffness is found to "print through" into the printed pattern; compensating for such a variable pattern through, for example, appropriate processing of the pattern data sent to the actuators may be far more complex than compensating for a modest overall decrease in stiffness of the manifold structure.

In order to counteract the variation in stiffness caused by the tapering of the manifold chambers, the size of the ribs 213, 223, 233 may vary over the length of the arrays of fluid chambers, such that the centroid of a cross-section through the manifold remains at substantially the same position with respect to the deposition direction 102 over the whole of the length of the arrays of fluid chambers.

It should be understood that the ribs 213, 223, 233 are just one example of a way of shaping the manifold component such that the cross-sectional shape of the manifold component 201 perpendicular to the array direction 101 may vary with distance in the array direction 101, such that the centroid of the cross-section remains a substantially constant distance, in the deposition direction 102, from the array of fluid chambers over the length of the array. Such shaping may mean that the manifold component 201 is essentially self-stiffening over the length of the array of fluid chambers. As a result, the need for stiffening components made of different materials may be obviated; this may avoid the stressing effects from the different thermal expansion of such components and/or may reduce the cost and complexity of manufacture for the completed printhead.

It should however be appreciated that the use of ribs 213, 223, 233 to counteract the tapering of the manifold chambers may provide certain advantages. Firstly, as the ribs are a generally simple shape, it may be straightforward to calculate how their shape should change over the length of the array so as to counteract the tapering of the manifolds. As in the embodiment shown in the drawings, the width of the ribs 213, 223, 233 and/or the manifold chambers 210, 220, 230 in the manifold width direction 103 may be kept substantially the same over the length of the array of fluid chambers, with only the height parallel to the deposition direction 102 varying to ensure the centroid of the cross-section remains at roughly the same location. Thus, to a reasonable level of approximation, calculations may need only determine a suitable height for the ribs, based on the current height of the manifold chambers 210, 220, 230.

Secondly, ribs are relatively more easily formed using molding techniques, as they are relatively narrow, which reduces the incidence of voids within the molded article. In addition, the ribs shown in the drawings may assist release of the formed article during molding as they taper monotonically in width (in the manifold width direction 103) with distance in the deposition direction 102. This is equally the case for the shape of the manifold chambers, which widen monotonically with distance in the deposition direction 102. The same may also be said with regard to the extent of the ribs and/or of the manifold chambers, in the array direction 101. Put differently, when viewed in the deposition direction 102, the manifold chambers may be shaped such that there are no over-hanging portions. Similarly, when the ribs are viewed from the opposite side of the manifold component 201, there may also be no over-hanging portions.

Further, as the ribs 213, 223, 233 are provided above the manifold chambers 210, 220, 230 with respect to the deposition direction 102, they may be particularly effective at counterbalancing the changes in the cross-sections of the manifold chambers 210, 220, 230. In more detail, it may be considered that the shape of the bottom portion of the manifold component 201, including the mounting surface, is essentially fixed (or at least that substantial variations in shape are difficult) since this part of the manifold component 201 is shaped so as to receive the actuator components. Therefore, to maintain the centroid of the cross-section at a constant height above the array in the deposition direction 102, it is most effective to "add" additional cross-sectional area to the manifold component 201 at the position furthest from the array with respect to the deposition direction 102. For this reason, features that are located above the manifold chambers 210, 220, 230 with respect to the deposition direction 102 may be particularly advantageous, with the ribs 213, 223, 233 being a particular example of this approach.

Furthermore, features such as the ribs 213, 223, 233 that extend generally away from the actuator components with respect to the deposition direction 102 may present increased surface area that can be thermally coupled with a heat-sink to draw heat away from drive circuitry 360 for the actuator components.

As may further be seen from FIG. 12, the shape of the manifold component 201 is generally symmetric about a plane extending normal to the manifold width direction 103, so that the shape of the cross-section of the left-hand manifold chamber 210 mirrors that of the right-hand manifold chamber 230 and the shape of central manifold chamber 220 is symmetric about its center. Providing such symmetry for substantially the whole of the manifold component may provide both arrays of fluid chambers with generally the same flow distribution, which may help to ensure that there are no noticeable differences in deposition between the arrays.

Further, by continuing this symmetry for substantially the whole of the manifold component 201, so that the manifold component 201 is generally symmetric about a plane normal to said manifold width direction 103 (or, put differently, a plane defined by the array 101 and deposition 102 directions), the centroid of the cross-section of the manifold component may remain at a substantially constant position with respect to said manifold width direction 103 over the length of the arrays of fluid chambers. As will be discussed in greater detail below, maintaining the centroid of the manifold component at a substantially constant position with respect to the manifold width direction 103 may ensure that the arrays formed in both the left-hand 110a and right-hand 110b strips of piezoelectric material experience substantially equal stresses.

It should however be appreciated that there may be other design approaches to providing a manifold component where the centroid of the cross-section of the manifold component taken perpendicular to the array direction 101 remains at a substantially constant position with respect to the manifold width direction 103 over the lengths of the arrays of fluid chambers. For example, ribs of variable width (with respect to said manifold width direction 103) might be provided at each side of the manifold component 201, in a similar approach to that with regard to ribs 213, 223, 233 disposed above the manifold chambers 210, 220, 230.

Further constructional details of the manifold component 201 are apparent from FIGS. 8 to 10. In particular, at each end of the manifold component 201 there is provided a mounting wing with a corresponding mounting pin 15a, 15b. The mounting pins 15a, 15b may be made of metal and over-molded into the manifold component so as to be securely attached thereto, though other methods of attachment such as bonding may also be suitable. The mounting pins 15a, 15b enable the completed inkjet printhead to be mounted into a printbar, or other mount within a printer.

Returning now to FIG. 12, there is shown in greater detail certain of the actuator components and their relative locations when attached to the manifold component 201. More particularly, FIG. 12 does not show the nozzle plate component 430 (unlike FIG. 10), so as to illustrate more clearly the actuator components that underlie the nozzle plate component 430.

Attached immediately to the mounting surface of the manifold component 201 is a generally planar substrate component 86. The substrate component may thus present two opposing faces, each being generally normal to the deposition direction 102, one of which is attached to the mounting surface of the manifold component 201, and the other of which acts as a supporting surface for further actuator components 110a, 110b, 410. In terms of construction, substrate component 86 may be somewhat similar to the substrate component illustrated and described with reference to FIG. 5. Substrate component 86 may be made of a ceramic material, such as alumina, so as to provide a rigid and robust support for two strips of piezoelectric material 110a, 110b, which are disposed thereupon. The material of the substrate component 86 may suitably be thermally-matched to the piezoelectric material of the two strips 110a, 110b; alumina may be preferred as a material for substrate 86 for this reason.

Figure 5:
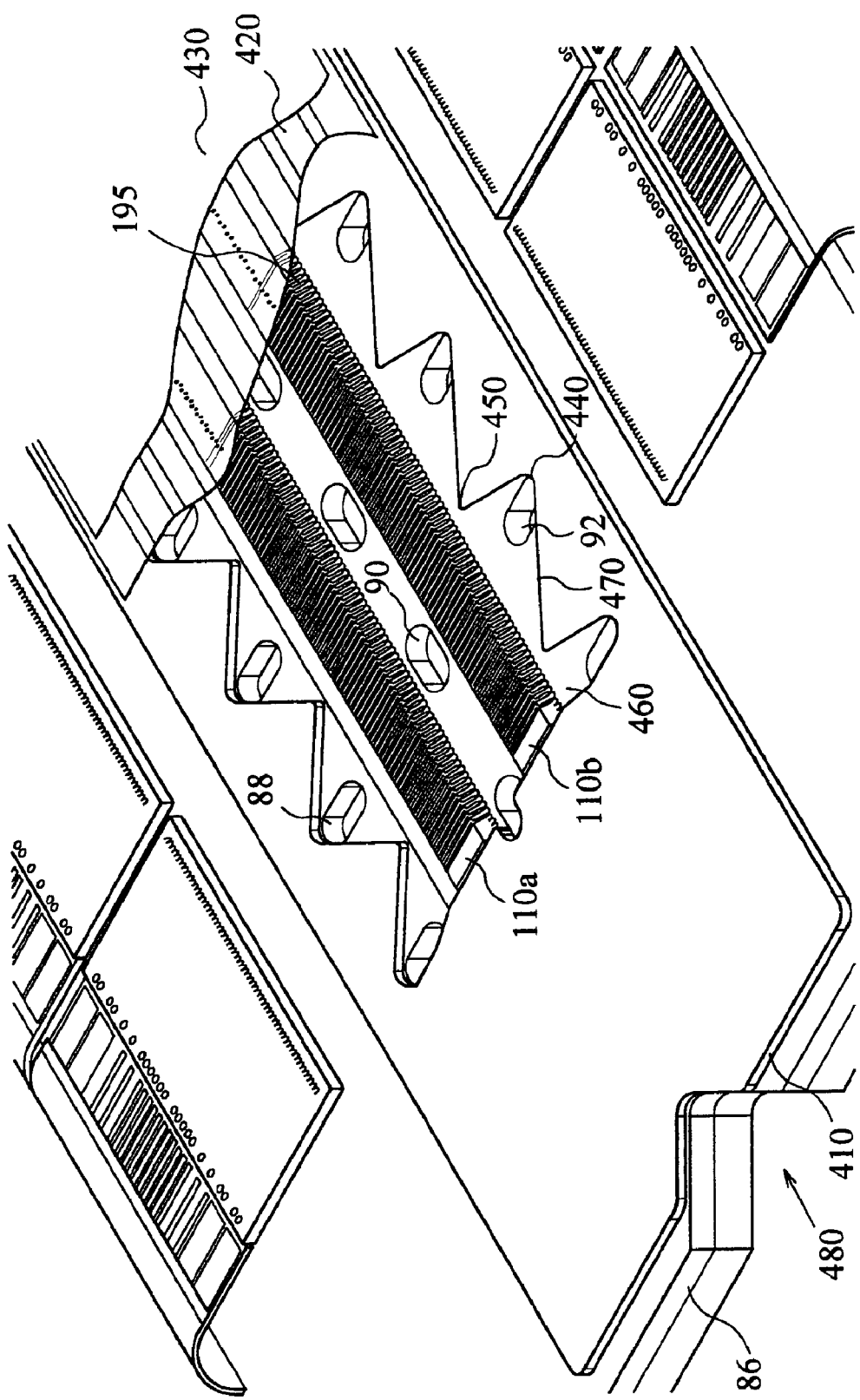
FIGS. 5 and 6 are perspective and detail perspective views respectively of a printhead disclosed in WO 01/12442 that illustrate how various features and components may be provided on a substrate.
Figure 6:
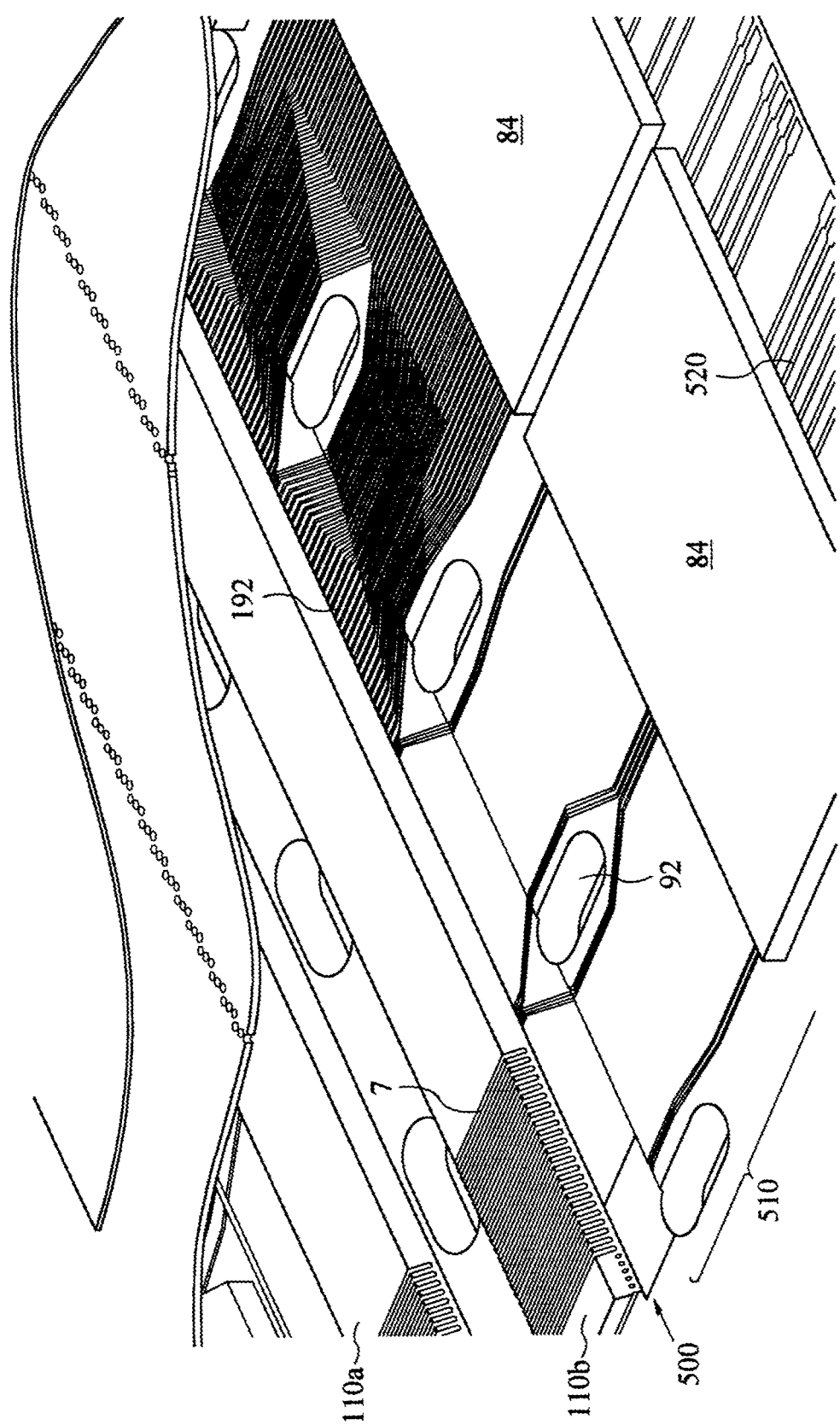
Figure 7:
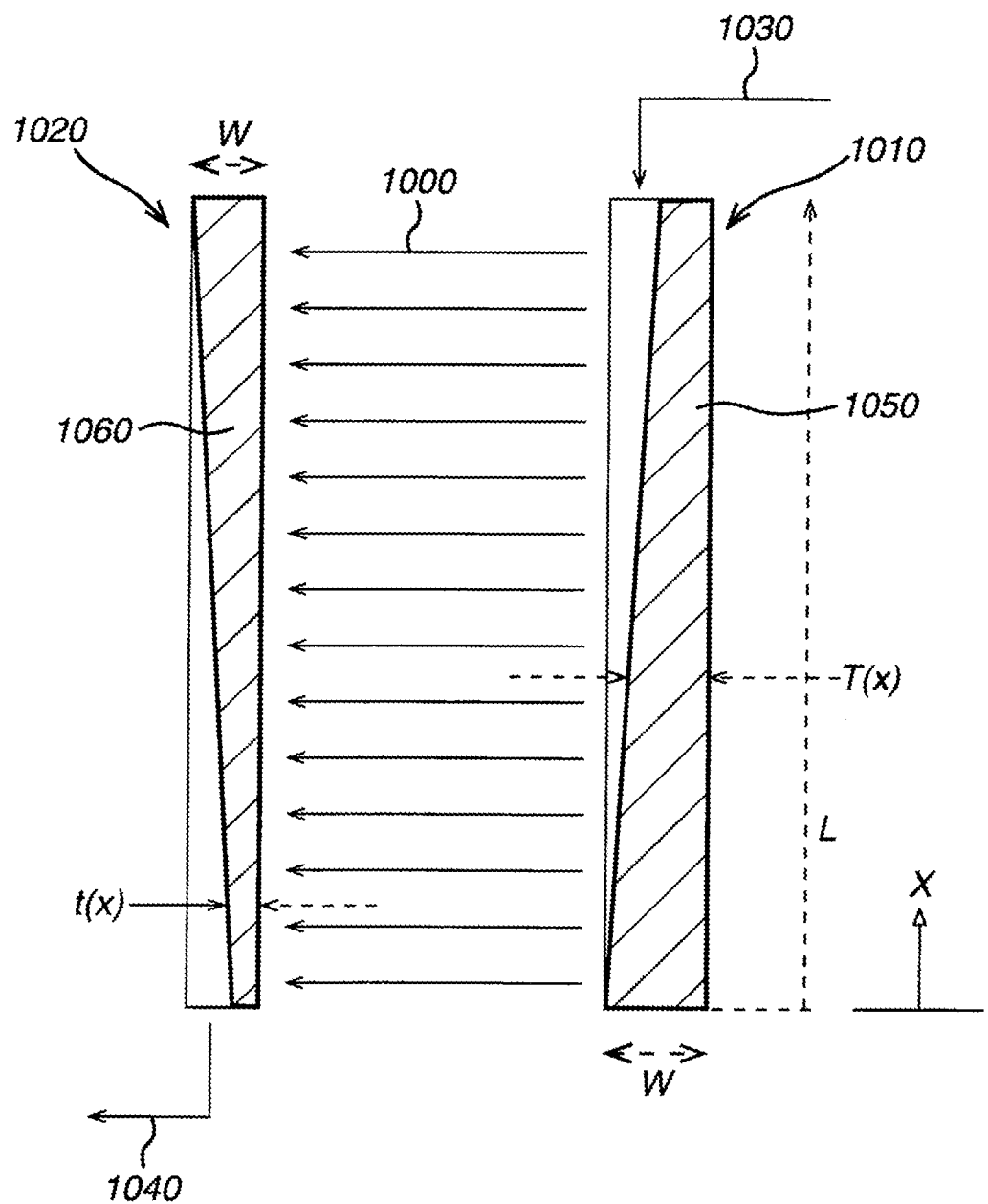
FIG. 7 illustrates a prior art printhead disclosed in WO 00/38928, which is designed such that the linear array of droplet fluid chambers may be arranged at a non-zero angle to the horizontal direction.

In a similar fashion to those shown in FIG. 5, the strips of piezoelectric material 110a, 110b have been machined into respective arrays of elongate channels, with consecutive channels separated by an elongate wall of piezoelectric material. WO 01/12442 teaches a number of ways of attaching the piezoelectric strips 110a, 110b to the substrate 86 and machining such channels, including forming saw cuts through the piezoelectric strips 110a, 110b.

Each of the channels may be elongate in a direction perpendicular to the deposition direction 102 (such as the manifold width direction 103, as shown in the figures), so that deposition is from the longitudinal side of the channel. For this reason, such an arrangement is commonly referred to as a "side-shooter".

As with the substrate 86 depicted in FIG. 5, the substrate 86 may include a number of ports 88, 90, 92 formed therein, which fluidically connect the manifold chambers 210, 220, 230 to the fluid chambers formed in the piezoelectric strips 110a, 110b. Specifically, a respective row of ports extending in the array direction 101 may be provided for each of the manifold chambers 210, 220, 230.

Figure 1:
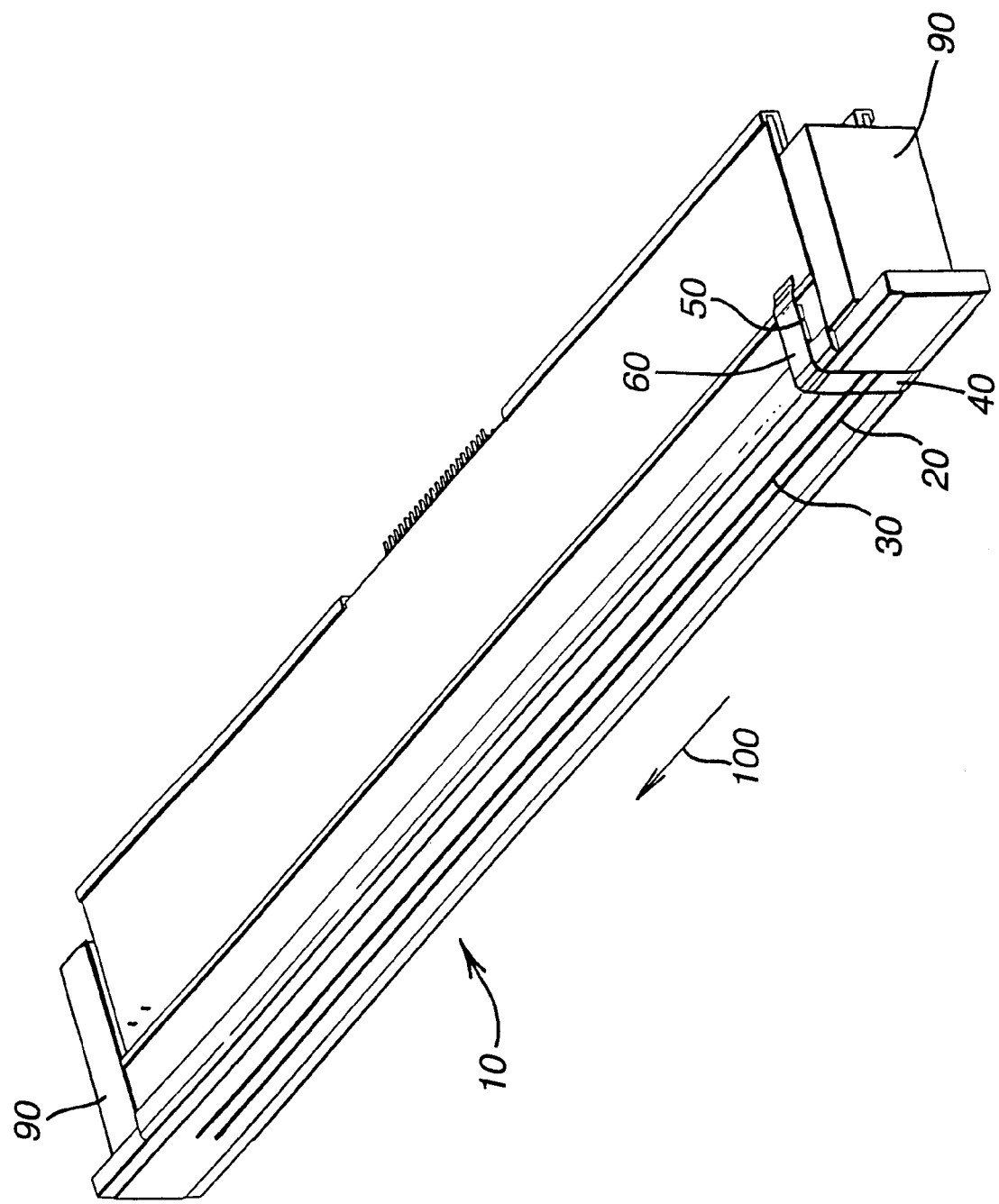
FIG. 1 is a perspective view of a prior art "pagewide" printhead taken from WO 00/38928.
Figure 2:
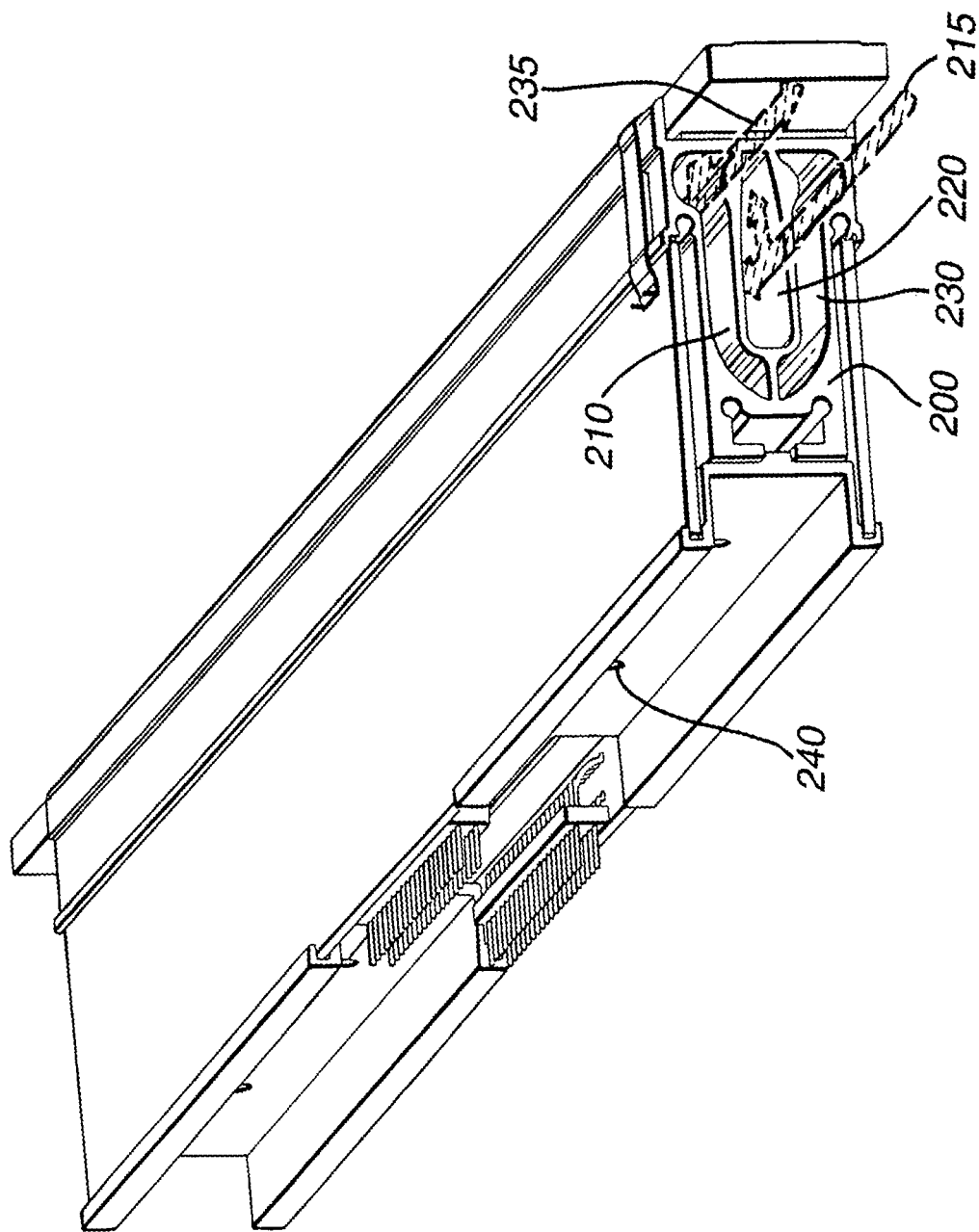
FIG. 2 is a perspective view from the rear and the top of the printhead of FIG. 1.
Figure 3:
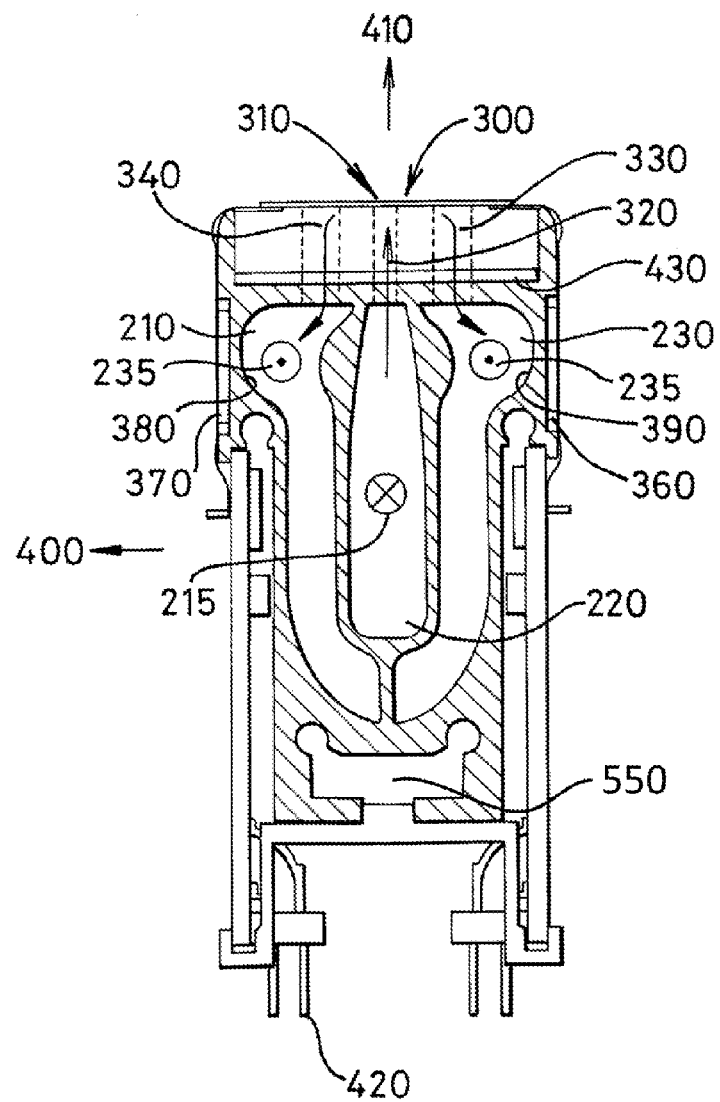
FIG. 3 is a sectional view of the printhead of FIGS. 1 and 2 taken perpendicular to the direction of extension of the nozzle rows.
Figure 4:
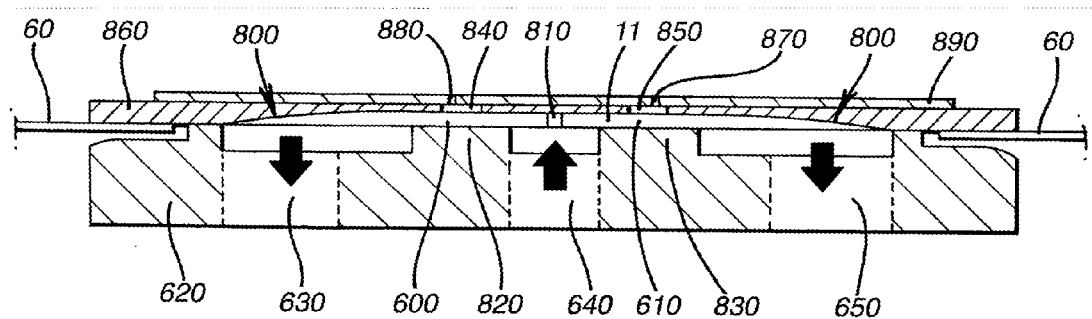
FIG. 4 is a section view taken along a fluid channel of an ink ejection module of the printhead of FIG. 2.

The ports 88, 90, 92 may enable a similar flow through the manifold component 201 to that shown in FIG. 3. More specifically, the ports 88, 90, 92 enable fluid to flow from the central manifold chamber 220, through the central row of ports 90, with the flow then separating into a portion that travels through the array of fluid chambers formed in the left-hand piezoelectric strip 110a, through the left-hand row of ports 88, and into the left-hand manifold chamber 210, and a portion that travels through the array of fluid chambers formed in the right-hand piezoelectric strip 110b, through the right-hand row of ports 92, and into the right-hand manifold chamber 230. It should be appreciated that the manifold component may also be connected so as to provide fluid flow in the opposite direction, with flows entering the arrays of fluid chambers formed in the left-hand 110a and right-hand 110b piezoelectric strips from, respectively, the left-hand manifold chamber 210, via the left-hand row of ports 88 and the right-hand manifold chamber 230, via the right-hand row of ports 90. These two flows meet above the central row of ports 90, through which the flow then travels, entering the central manifold chamber 220.

Also disposed on the surface of the substrate 86 facing away from the manifold component 201 is a spacer component 410. Viewed from the mounting surface side of the manifold component 201, the spacer component 410 is shaped so as to surround the piezoelectric strips 110a, 110b. The spacer component 410 provides an attachment surface that extends around the piezoelectric strips 110a, 110b and normal to the deposition direction 101; the nozzle plate 430 may then be bonded to this attachment surface so as to enclose the channels formed in piezoelectric strips 110a, 110b, thus providing an array of elongate fluid chambers. Alternatively, as shown in FIG. 5, a cover member 420 may be attached to the attachment surface of the spacer component 410, with a nozzle plate 430 bonded over the cover member 420.

As is shown in FIGS. 8 to 10, two ink supply pipes 280, 290 are provided on the opposite side of the manifold component 201 to the mounting surface that enable connection to an ink supply system. As with mounting pins 15a, 15b, the ink supply pipes 280, 290 may be made of metal and over-molded into the manifold component so as to be securely attached thereto, though other methods of attachment such as bonding may also be suitable. Also visible in FIGS. 9 and 10 are respective caps 285, 295 for the ink supply pipes 280, 290 that may attached before the printhead is shipped. As may also be seen from the drawings, the fluid supply pipes extend in generally the opposite direction to the mounting surface so as to reduce the footprint of the completed printhead when mounted in a printer. During use, either one of the two ink supply pipes 280, 290 may be connected to the fluid supply system so as to act as an inlet pipe, with the other of the two pipes 280, 290 being connected as an outlet pipe.

At a general level of detail, ink pipe 280 is connected, via a conduit formed in the opposite side of the manifold component 201 to the actuator components, to the central manifold chamber 220, whereas ink pipe 290 is connected, again via a collector conduit 270 formed in the opposite side of the manifold component 201 to the actuator components, to both the left-hand and right-hand manifold chambers 210, 230.

Figure 13:
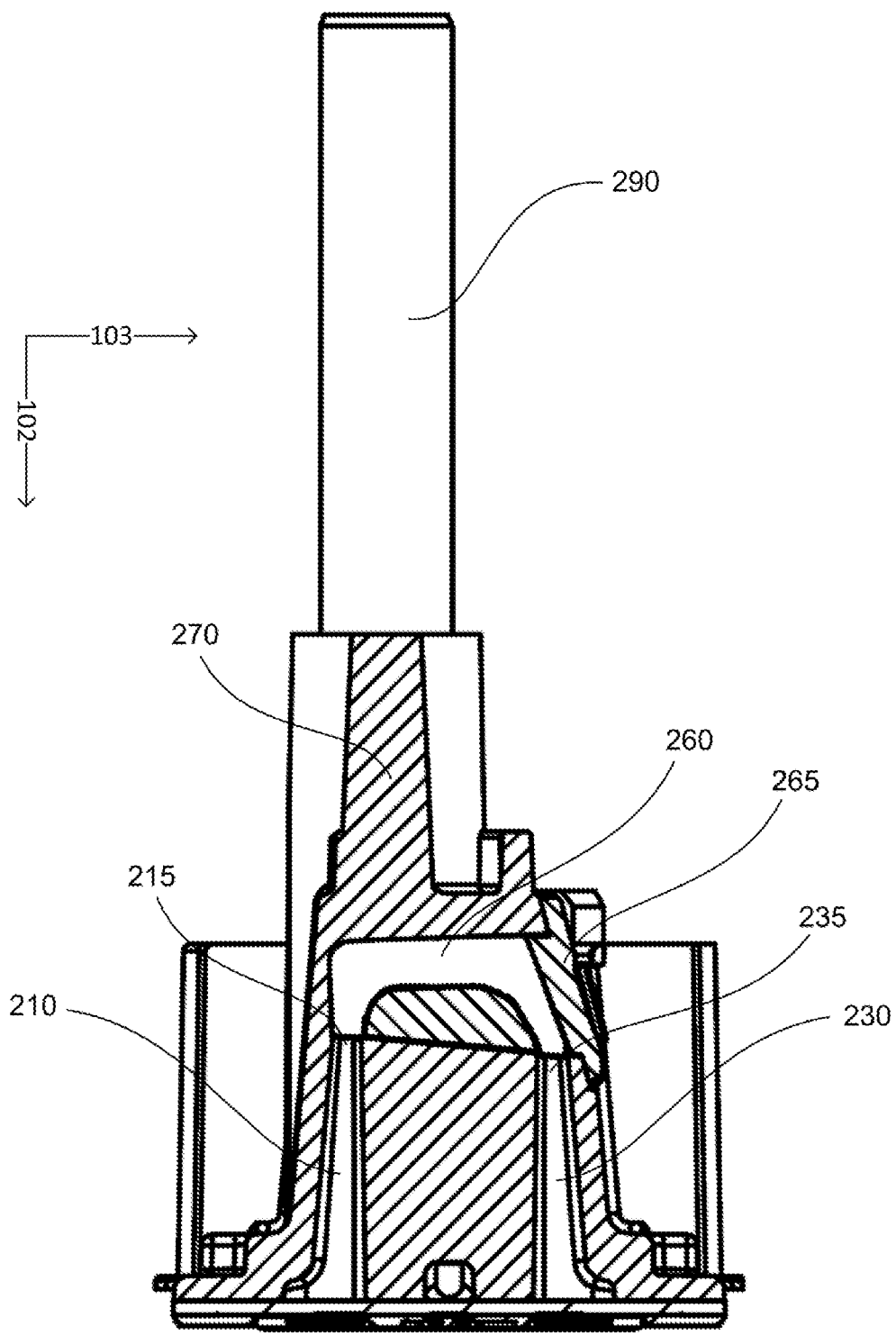
FIG. 13 is a further cross-sectional view of the manifold component of FIG. 8, which shows various conduits within the manifold component.

Attention is now directed to the cross-section through the manifold component 201 that is shown in FIG. 13, which is a sectional view through the manifold component 201 in the plane indicated by FIG. 11; this cross-section shows in more detail how the ink supply pipes 280, 290 are fluidically connected to the manifold chambers 210, 220, 230. As is apparent from the figure, ink pipe 290 is connected via to a collector conduit 270 formed in the rear of the manifold component 201 (on the opposite side to the mounting surface and actuator components), to the left-hand and right-hand manifold chambers 210, 230. As also shown in FIG. 13, a fluid junction 260 may therefore be provided within the manifold component 201, where the collector conduit 270 connected to ink pipe 290 branches into two subsidiary fluid conduits 215, 235.

Though not visible in the cross-section shown in FIG. 13, ink pipe 280 is connected, also via a fluid conduit formed in the rear of the manifold component 201 (again, on the opposite side to the mounting surface and actuator components), to the central manifold chamber 220.

As noted above, either of the ink pipes 280, 290 may be connected as an inlet pipe, with the other connected as an outlet pipe. Where ink pipe 280 is connected as an inlet pipe and ink pipe 290 as an outlet pipe, fluid flows from ink pipe 280, through conduit 225 and into central manifold chamber 220, before separating, with a portion traveling through the left-hand array of fluid chambers to the left-hand manifold chamber 210, and a portion traveling through the right-hand array of fluid chambers into the right-hand manifold chamber 230. The two flows then travel respectively along the left-hand and right-hand subsidiary conduits 215, 235 (in a direction generally opposite to the deposition direction 102 and away from the actuator components), before re-joining in the fluid junction 260 and continuing along the collector conduit 270 to the ink pipe 290 and so to the ink supply system.

By contrast, where ink pipe 290 is connected as an inlet pipe and ink pipe 280 as an outlet pipe, fluid enters the manifold component 201 via collector conduit 270, before separating at the fluid junction 260, with part of the flow continuing along the left-hand and right-hand subsidiary conduits 215, 235 (in a direction generally parallel to the deposition direction 102 and towards the actuator components). The flows from the left-hand and right-hand subsidiary conduits 215, 235 then enter, respectively, the left-hand 210 and right-hand 230 manifold chambers, before flowing respectively through the left-hand and right-hand arrays of fluid chambers and re-joining to travel through the central manifold chamber 220. Finally, the fluid leaves the central manifold chamber 220 through the conduit 225 connected to ink pipe 280 and thus returns to the ink supply system.

Suitably, the ink supply system may apply a positive fluid pressure at the pipe connected as an inlet pipe and a negative pressure at the pipe connected as an outlet pipe, so as to drive a constant flow through the printhead. The magnitude of the negative pressure may be somewhat greater than the magnitude of the positive pressure, so that a negative pressure (with respect to atmospheric pressure) is achieved at the nozzles, which may prevent fluid "weeping" from the nozzles during use.

Further internal constructional details may be apparent from FIG. 13. More specifically, a fluid flow plug 265 may be provided that is inserted into a corresponding socket 266 within the manifold component 201; the location and shape of the socket 266 are illustrated in FIG. 8.

As shown in the cross-sectional view of FIG. 13, fluid flow plug 265, combines with the manifold component 201 to provide the fluid junction 260. Providing the fluid junction 260 with the combination of these two components may allow the surfaces of the junction 260 to be accurately defined with components that are easily molded, it being appreciated that interior surfaces are more difficult to define using molding techniques.

In an optional modification of the embodiment shown in FIG. 13, the fluid flow plug 265 may be shaped so that it has an adjustable effect on the flows through the subsidiary conduits 215, 235. Specifically, the fluid flow plug 265 may be used to adjust the pressure drop between the left-hand and right-hand subsidiary conduits 215, 235 to ensure that they both present substantially the same amount of impedance to fluid flow. Additionally, or alternatively, the fluid flow plug 265 may be adjusted to ensure substantially the same amount of flow is present in each of the subsidiary conduits 215, 235 and/or that there is the same pressure drop for fluid flowing along each of the subsidiary conduits 215, 235 to (or from) the fluid junction 260.

Such functionality may, for example be provided by shaping the fluid flow plug 265 so as to be rotatable within the corresponding socket 266 within the manifold component 201. Rotation of the plug may alter the respective flow paths seen by the fluid travelling along each of the subsidiary conduits 215, 235. For example, rotation in one sense may present cause an aperture presented by the plug 265 to the left-hand subsidiary conduit 215 to become smaller and an aperture presented by the plug 265 to the right-hand subsidiary conduit 235 to become larger; rotation in the opposite sense may have the opposite effect, with the aperture presented to the left-hand subsidiary conduit 215 becoming larger and the aperture presented to the right-hand subsidiary conduit 235 becoming smaller. Such apertures may be provided adjacent said junction 260, with said junction being provided substantially within said fluid flow plug 265.

Alternatively, such functionality may be provided by shaping the fluid flow plug so as to be progressively moveable into and out of the corresponding socket 266. Such movement may similarly alter the size of apertures presented to the subsidiary conduits 215, 235 and, therefore, such apertures may suitably be provided adjacent the junction 260, with the junction being provided substantially within said fluid flow plug 265. Combinations of rotation and insertion may equally be provided in other embodiments.

Figure 14:
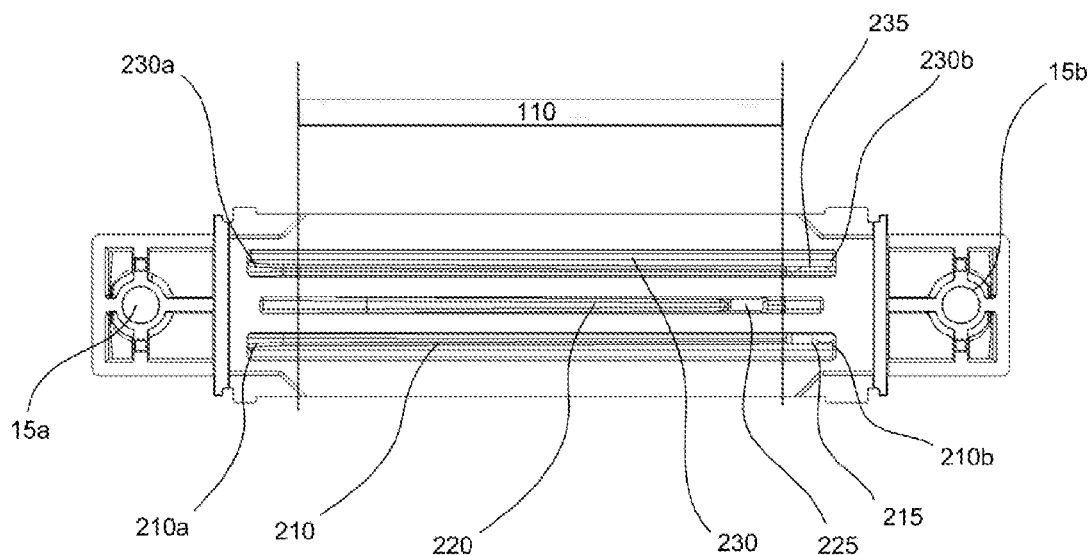
FIGS. 14 and 15 are views from below the manifold component of FIG. 8, showing the relative size and location of strips of piezoelectric material.
Figure 15:
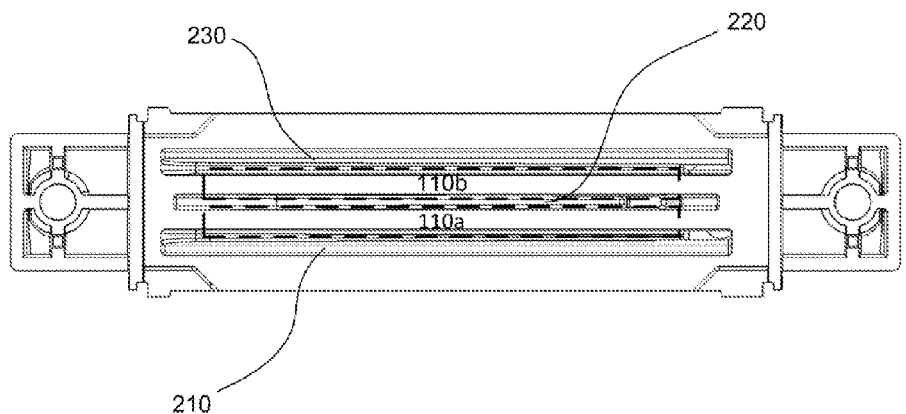
Figure 16:
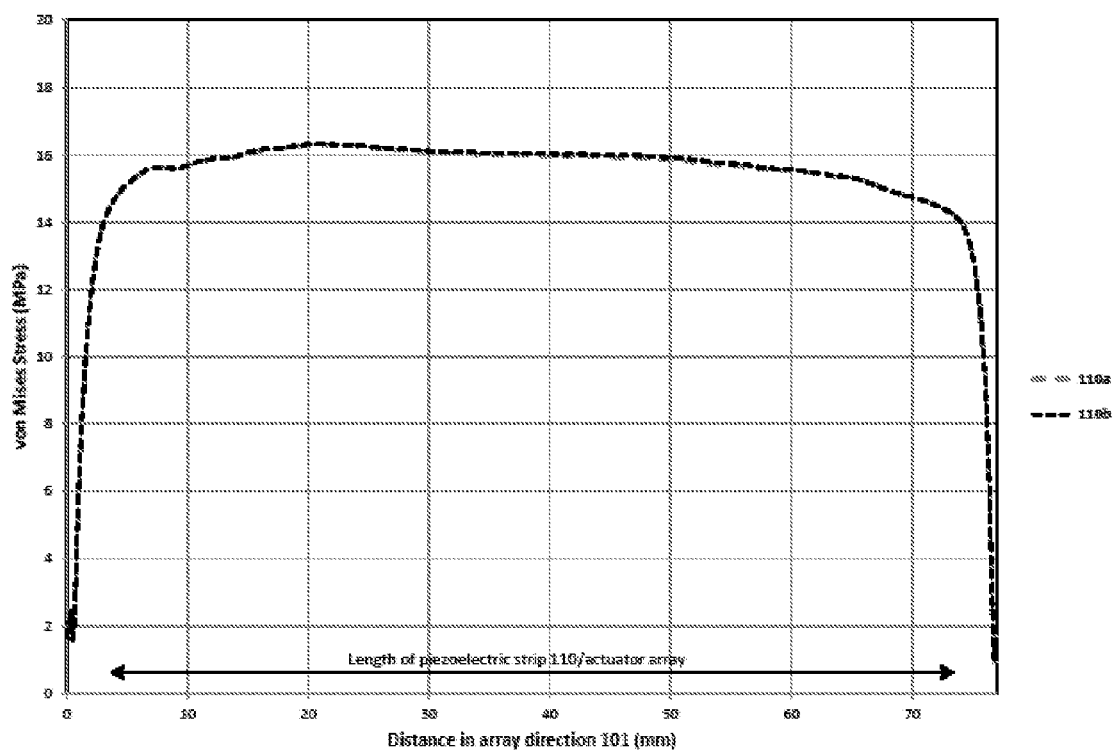
FIG. 16 shows the results of a stress analysis of the manifold component shown in FIG. 8.

Attention is now directed to FIGS. 14 to 16, which illustrate additional inventive concepts that may be combined with the self-stiffening concept discussed above with regard to FIG. 8 to 13, or may be implemented independently. All of FIGS. 14 to 16 are views from below (taken in the opposite direction to the deposition direction 102 shown in FIG. 10). FIGS. 14 and 15 show the manifold component of FIGS. 8 to 13 and, in particular, the relative size and location of the strips of piezoelectric material 110*a*, 110*b* with respect to the manifold chambers 210, 220, 230.

FIG. 14 shows, using a solid rectangular outline, the area covered by a single piezoelectric strip 110 and indicates, by means of lines laid across the manifold component 201, the position of the piezoelectric with respect to the array direction 101.

Similarly, FIG. 15 shows, using two dashed rectangular outlines, the positions of the left-hand and right-hand strips of piezoelectric material 110*a*, 110*b* when mounted on the manifold component. As will be apparent from FIGS. 13 and 14, with respect to the array direction 101, the length of each of the piezoelectric strips 110*a*, 110*b* stops short of both the first longitudinal ends 210*a*, 230*a* and, at the opposing end of the piezoelectric strips, the second longitudinal ends 210*b*, 230*b* of both the left-hand 210 and right-hand 230 manifold chambers. Put differently, both longitudinal ends of the manifolds extend beyond both ends of the piezoelectric strips 110*a*, 110*b*.

The Applicant has discovered, through analysis of the stresses within manifold components, that the rate of variation in stress with respect to distance in the array direction is greatest in the regions adjacent the longitudinal ends of the manifolds. FIG. 16 show the results of such an analysis, which plots the von Mises stress within the manifold component shown in FIGS. 8-15 against distance in the array direction 101. More specifically, the values on the y-axis of the plot represent the stresses on a midline on the top surface (that closest to the manifold component 201) of each piezoelectric strip 110*a*, 110*b*. As may be seen, there is a substantial drop-off in stress towards the longitudinal ends 210*a*, 210*b*, 230*a*, 230*b* of the manifold chambers. More specifically, the greatest change in stress is found to occur in approximately the first 5 mm of the manifold chambers, corresponding to around the first 6% of the manifold chambers. However, as will be apparent from considering, for example, the right-hand side of the plot, substantial benefits may be found within distances as small as 3 mm, corresponding to around 4% of the length of the manifold chamber.

In addition, it may be desirable to deactivate the end-most chambers within the arrays so as to compensate for related edge-effects (for example by providing no electrical connections, or by sending non-firing signals to the corresponding piezoelectric actuators). The most marked change in such effects is found to occur in approximately the first 2.5 mm of the array, corresponding to around 4% of the length of the array. This may be considered as, in effect, reducing the available width of the print swathe. Accordingly, where a particular print swathe width is required (for example, corresponding to a standard substrate size, such as A2, A3, A4 etc.), a piezoelectric actuator may be provided that extends 2.5 mm at each end beyond the overall width of the print swathe (the width being measured perpendicular to the direction of substrate indexation), with the end most-chambers in the 2.5 mm extension deactivated, to compensate for the end effects. This will shift the "end drop off" artefacts outside of the print swathe, thus achieving better uniformity of the print profile.

It may be noted that, while FIGS. 8 to 15 show constructions including two arrays of fluid chambers, the advantages of having a manifold chamber extending beyond a longitudinal end an array of fluid chambers may be felt in constructions having only one array of fluid chambers and thus only two manifold chambers.

It may further be noted that almost exactly the same stress profile is experienced by both left-hand 110a and right-hand 110b arrays of chambers. As noted above with regard to FIG. 12, this may be achieved by shaping the manifold component 201 so that the centroid of the cross-section of the manifold component taken perpendicular to the array direction 101 remains at a substantially constant position with respect to the manifold width direction 103 over the lengths of the arrays of fluid chambers. In the construction depicted in FIGS. 8 to 15, this is accomplished by designing the shape of the manifold component 201 so as to be generally symmetrical about a plane normal to the manifold width direction 103 (or, put differently, a plane defined by the array 101 and deposition 102 directions). By providing substantially the same stress profile at both arrays, the manifold component 201 may substantially reduce the difference in deposition properties between the two arrays.

In addition, having both longitudinal ends of the manifolds extend beyond both ends of the piezoelectric strips 110a, 110b allows the two subsidiary fluid conduits 215, 235 and the fluid junction 260 to be longitudinally separated from the arrays of fluid chambers, by locating the fluid conduits 215, 235 beyond the respective longitudinal ends of the arrays of fluid chambers, as shown in FIG. 14. As a result, the change in cross-sectional area of the manifold component 201 with respect to distance in the array direction 101 caused by the two subsidiary fluid conduits 215, 235 and the fluid junction 260 is also spaced apart from the arrays of fluid chambers and the attendant variation in stress within the manifold component therefore has a less pronounced effect on variation in droplet deposition within the arrays of fluid chambers.

As also shown in FIGS. 14 and 15, the centres of the piezoelectric strips 110a, 110b and manifold chambers 210, 220, 230 may be aligned with respect to the array direction 101. This may further improve the uniformity of droplet deposition over the arrays.

As may also be apparent from FIG. 14, the fluid junction 260 may be located so as to overlap with the central manifold chamber 220. This may advantageously reduce the footprint of the completed printhead over the substrate when compared to prior art designs, such as that taught by WO 00/38928, where ink supply to and from the printhead is via respective bores in end-caps 90 of the printhead.

In addition, as the junction 260 may be spaced-apart from the arrays of fluid chambers by the central manifold chamber 220, the change in cross-sectional area of the manifold component with respect to the array direction that results from the junction 260 may have less effect on the stresses experienced adjacent the array of fluid chambers. As a result, the properties of droplets deposited by fluid chambers near the junction may not differ substantially from those of droplets deposited by fluid chambers elsewhere in the array.

Figure 17:
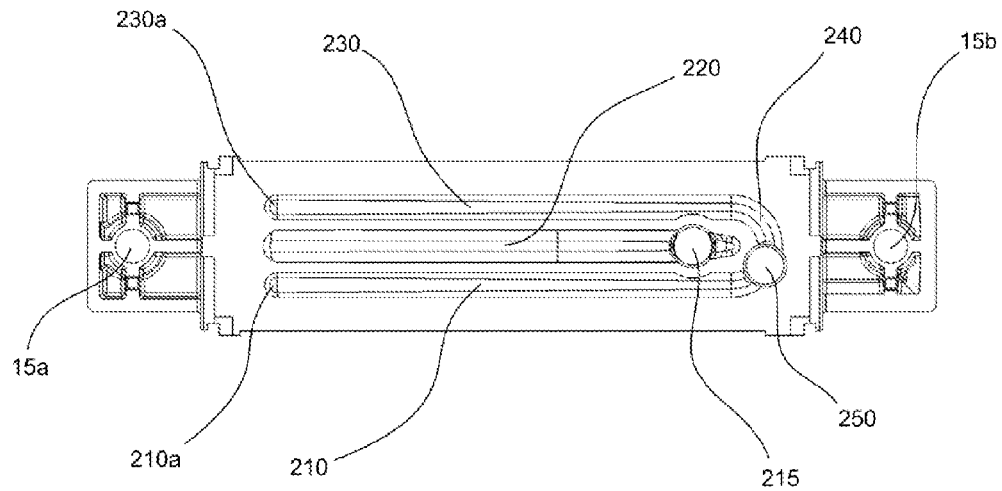
FIG. 17 illustrates a further embodiment of a manifold component for an inkjet printhead.
Figure 18:
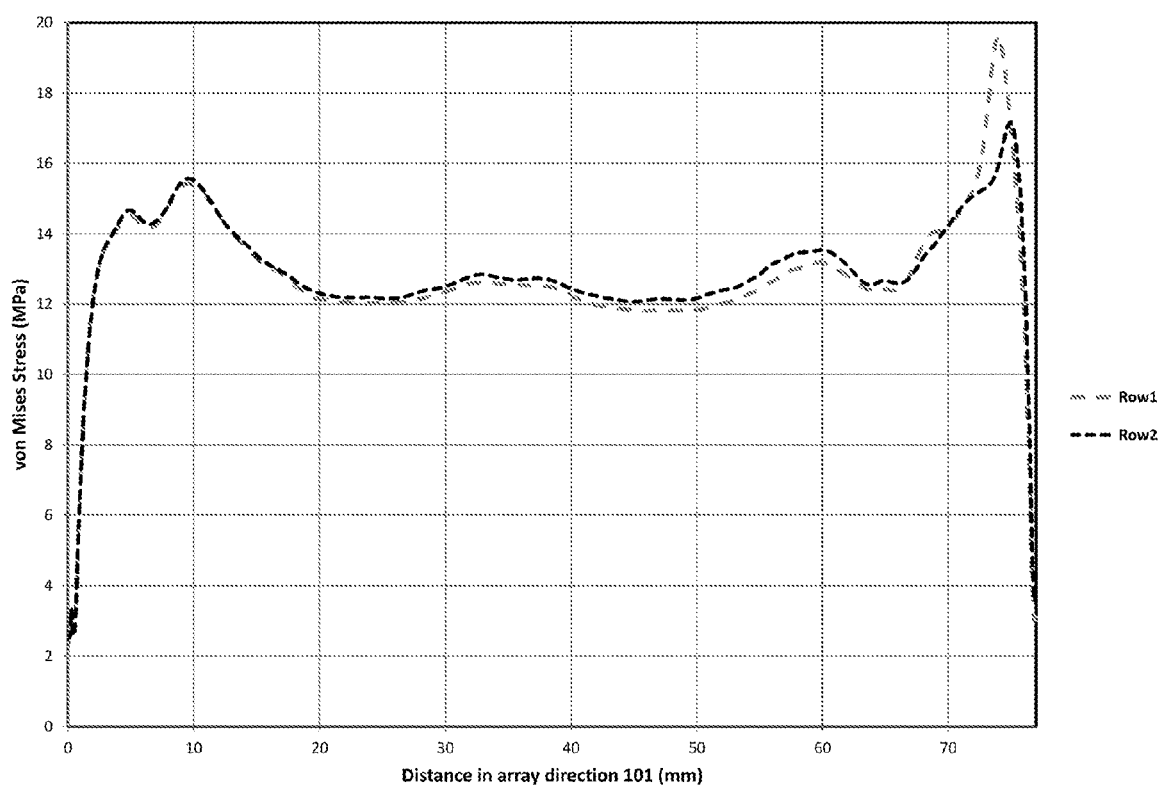
FIG. 18 shows the results of a stress analysis of the manifold component shown in FIG. 17.

The advantageous effects of providing a fluid junction 260 that connects subsidiary conduits 215, 235 to collector conduit 270 behind the central manifold chamber 220 may be apparent from comparing the stress profile shown in FIG. 16, which as noted above results from an analysis of the manifold component shown in FIGS. 14 and 15, with the stress profile shown in FIG. 18, which results from an analysis of the manifold component shown in FIG. 17.

In more detail, the manifold component shown in FIG. 17 includes a horse-shoe shaped manifold chamber portion 240, which connects the left-hand manifold chamber 210 to the right-hand manifold chamber 230. This allows a single conduit 250, which extends generally away from the actuator components with respect to the deposition direction 102, to be connected to the left-hand 210 and right-hand 230 manifold chambers. However, as may be apparent from considering the right-hand end of the stress profile shown in FIG. 18 (which corresponds to the right-hand end of the manifold component in the view shown in FIG. 17) such a construction leads to significant variations in stress in the array direction. When compared to the stress profile shown in FIG. 16, for the manifold component shown in FIGS. 14 and 15, it is clear that the manifold component of FIGS. 14 and 15 experiences substantially less variation in stress over the length of the array.

Comparative print-testing of printheads utilizing the manifold component shown in FIGS. 14 and 15 and printheads utilizing the manifold component shown in FIG. 17 demonstrates that such variations in stress may have a marked effect on the variation in droplet size in the array direction. The results of such comparative testing are displayed in FIGS. 22 to 24.

Figure 22:
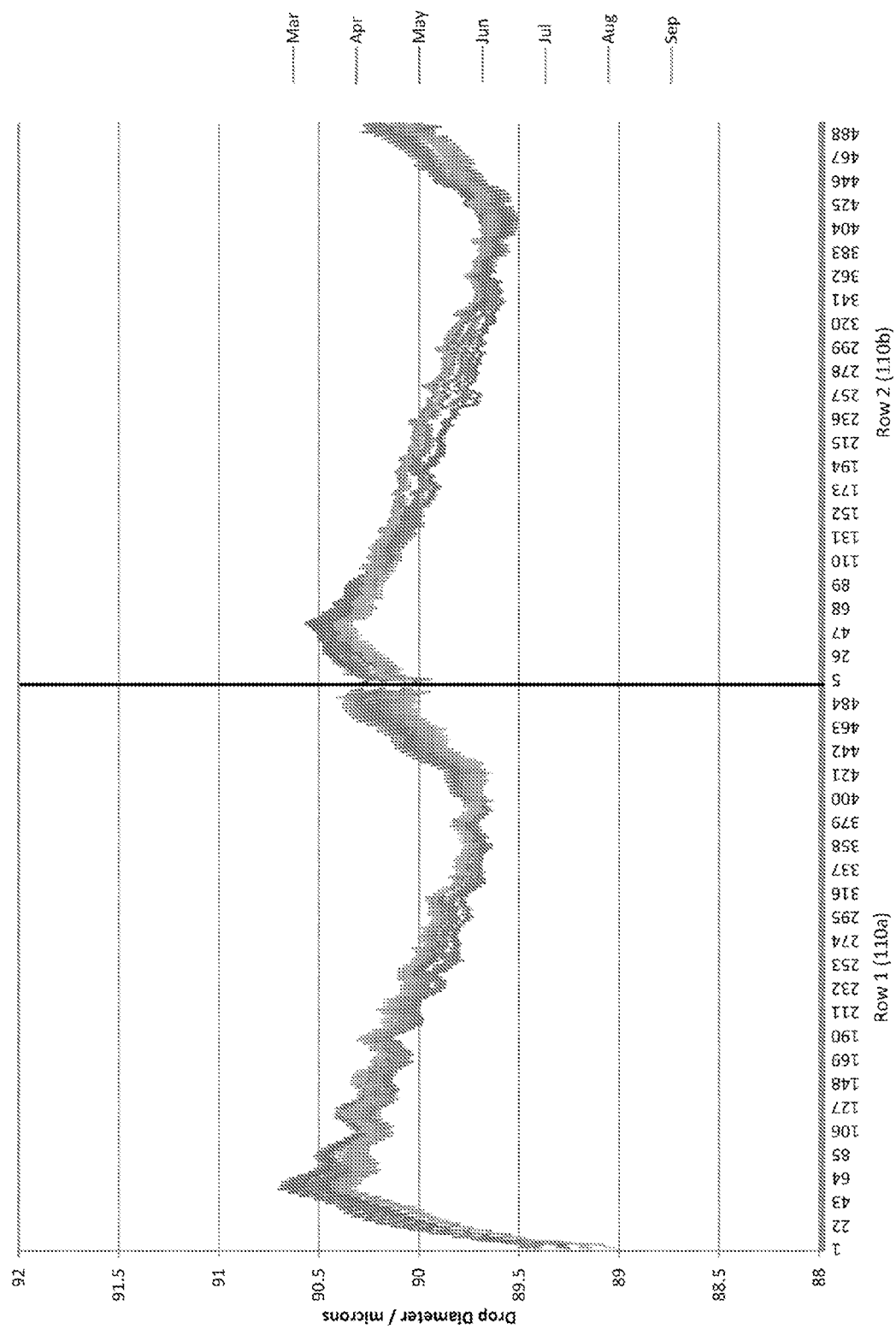
FIG. 22 shows the results of a print test carried out on a printhead utilising the manifold component of FIGS. 14 and 15.
Figure 23:
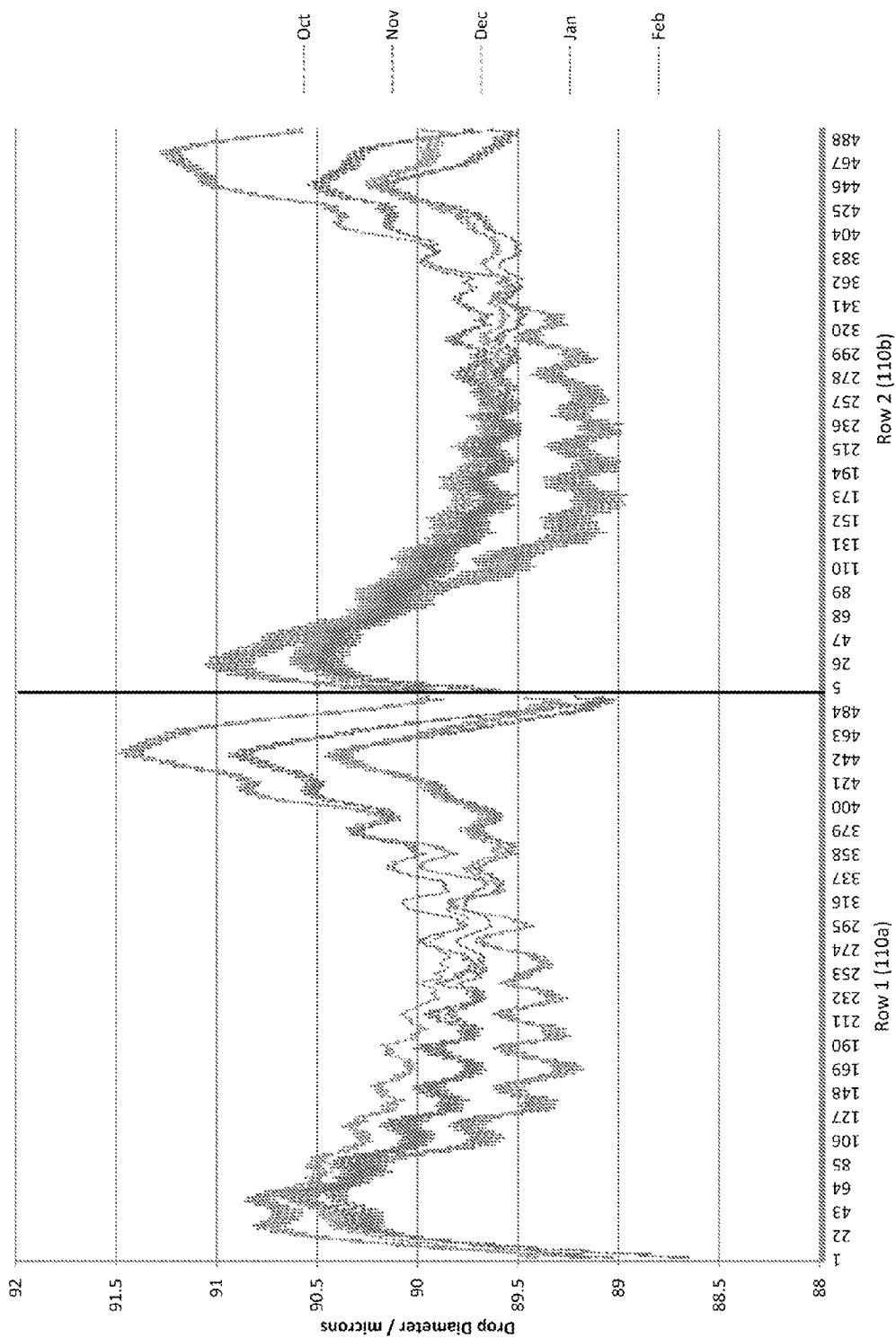
FIG. 23 shows the results of a print test carried out on a printhead utilising the manifold component of FIG. 17.
Figure 24:
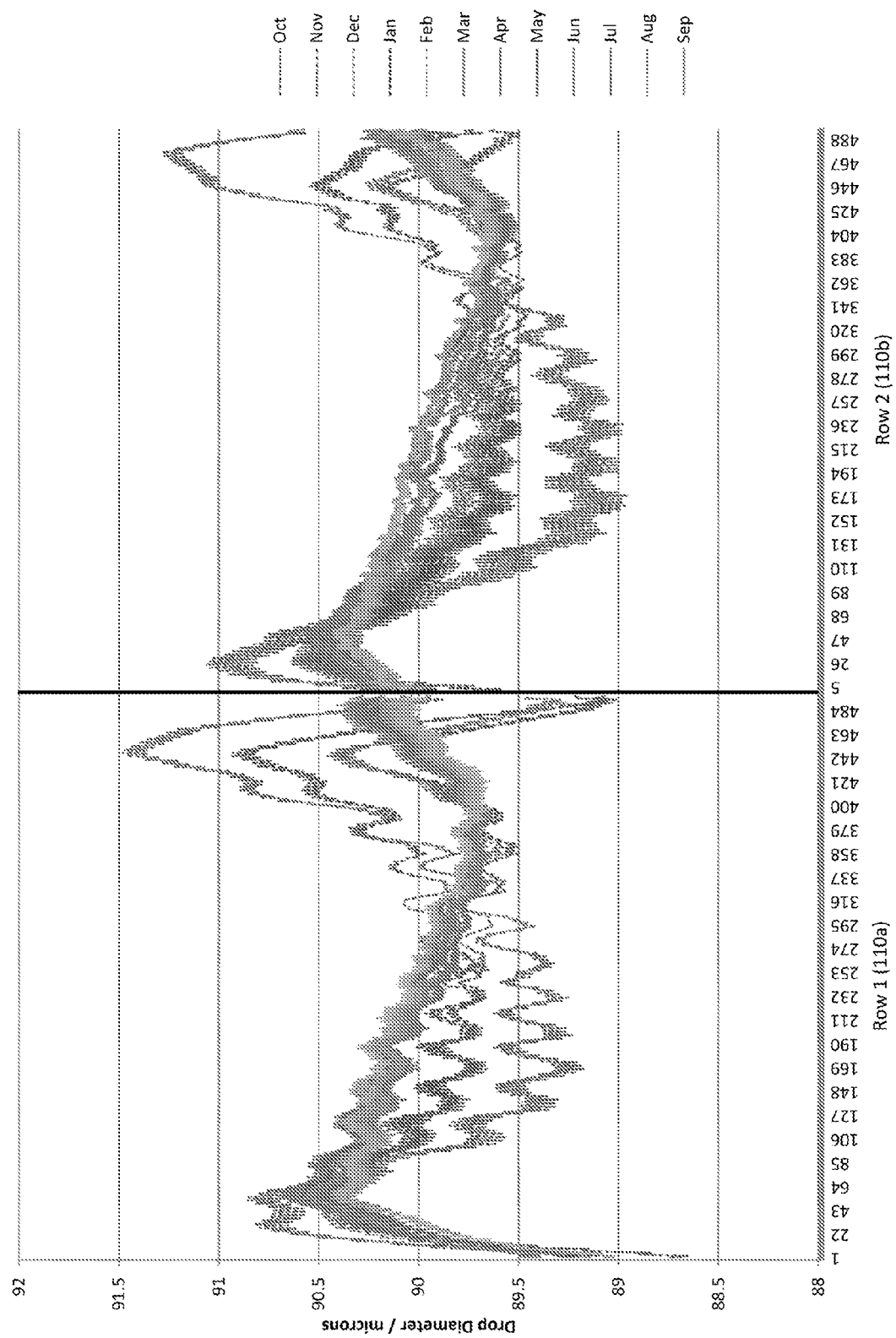
FIG. 24 shows the data illustrated in FIG. 22 overlaid with the data illustrated in FIG. 23.

More particularly, FIGS. 22 to 24 illustrate the results of monthly print tests where all chambers in both rows (110a, 110b) of a printhead were actuated such that all chambers would produce droplets of nominally equal size. In the particular printheads tested, each row had nearly 500 chambers; the diameters of the drops produced by each of these chambers were measured so that the departure from nominal behaviour could be studied.

From October to February, tests were carried out on printheads utilizing the manifold component shown in FIG. 17, with the results of these tests being shown in FIG. 23 (which may be compared with the stress profile shown in FIG. 18). Specifically, FIG. 23 shows on its y-axis the diameter (in microns) of the droplet from a particular chamber, whereas the x-axis gives the number of that chamber within the array. Each monthly test is displayed as a separate dotted line on the graph. As may be seen, the graphs for the two rows of the printhead are separated from each other in the x-direction for clarity.

From March to September, monthly print tests were carried out on printheads utilizing the manifold component shown in FIGS. 14 and 15, with the results of these tests being shown in a similar fashion to FIG. 23, in FIG. 22 (which may be compared with the stress profile shown in FIG. 16). In contrast to FIG. 23, however, the results of the tests in FIG. 22 are shown with solid lines.

FIG. 24 then shows the results of all of the tests overlaid on the same axes, so that the improvement in the variation in droplet diameter, when moving from the manifold component shown in FIG. 17 to the manifold component shown in FIGS. 14 and 15, is still more apparent. Again, the results of the tests for the printhead utilizing the manifold component shown in FIGS. 14 and 15 are illustrated using solid lines and the results of the tests for the printhead utilizing the manifold component shown in FIG. 17 are illustrated using dotted lines. As may be seen, there is a clear, quantitative improvement in the variation in droplet size in the array direction when the manifold component illustrated in FIGS. 14 and 15 is utilized. As may also be seen, there is significantly less difference in droplet size between the two rows of chambers (110a, 110b) when the manifold component illustrated in FIGS. 14 and 15 is utilized, as compared with the difference in droplet size between the two rows of chambers when the manifold component illustrated in FIG. 17 is utilized.

It may be noted that the particular fluid junction 260 shown in FIGS. 14 and 15, whose benefits are discussed above, is arranged so that it connects subsidiary conduits 215, 235 to collector conduit 270 behind the central manifold chamber 220, as well as being arranged so that the subsidiary conduits 215, 235 and fluid junction are located beyond the longitudinal ends of the arrays of fluid chambers. It should however be appreciated that the advantages of such a fluid junction 260 may be felt even where the subsidiary conduits 215, 235 and fluid junction 260 are not located beyond the longitudinal ends of the arrays of fluid chambers.

Figure 19:
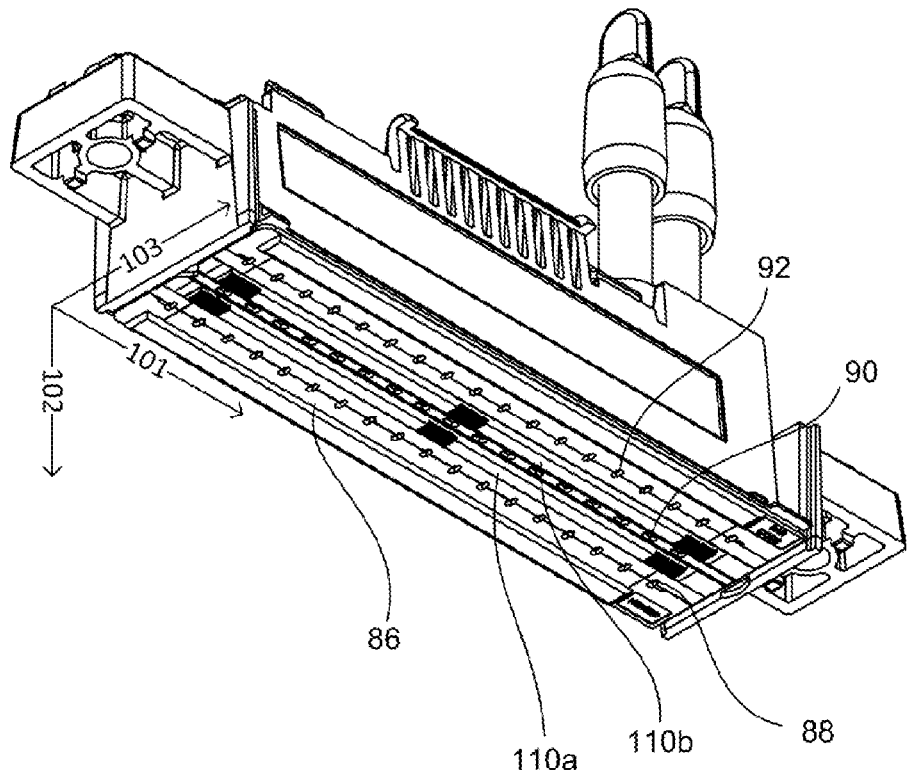
FIGS. 19 and 20 are further perspective views of the manifold component of FIG. 8, showing only certain actuator components so that their arrangement is clearly displayed.
Figure 20:
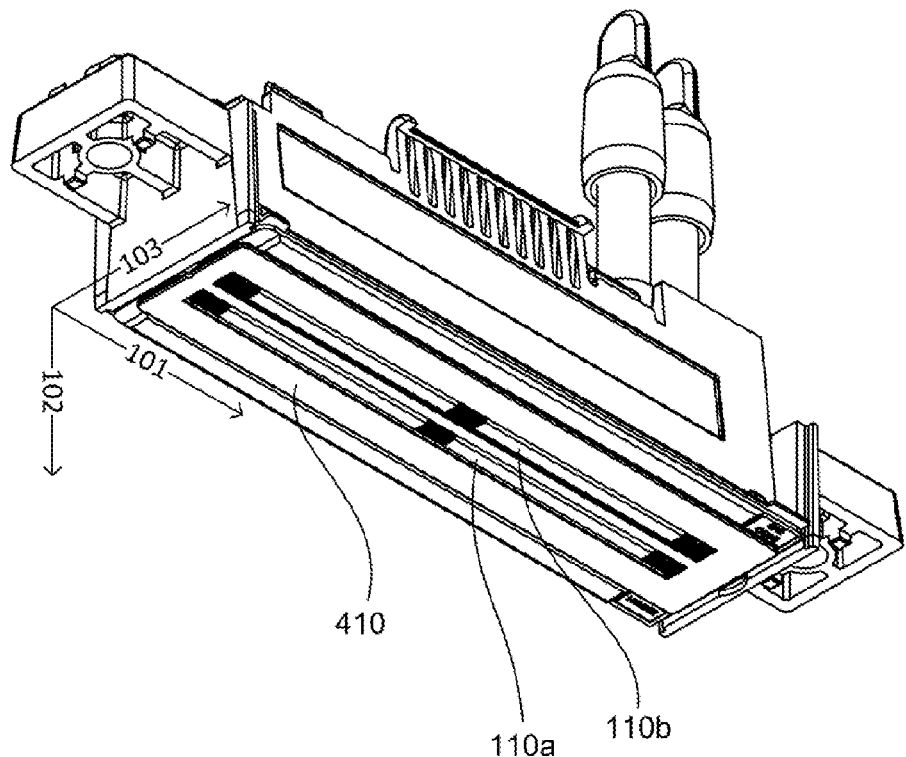
Figure 21:
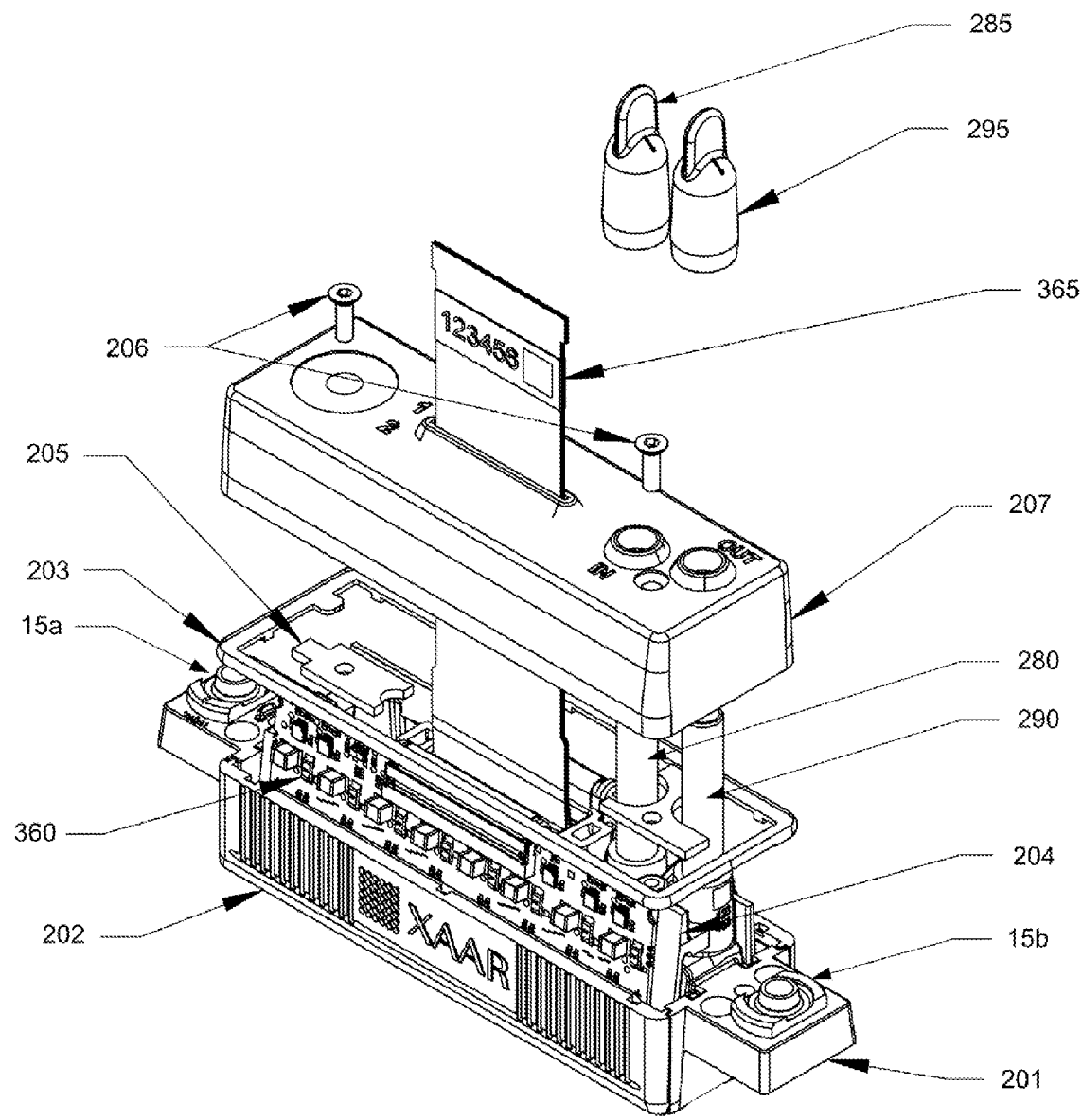
FIG. 21 is a partially exploded view of components, including the manifold component of FIG. 8, for an inkjet printhead.

FIGS. 19 to 21 illustrate the assembly of a printhead using the manifold component according to the embodiment shown in FIGS. 8-15.

FIG. 19 shows the manifold component 201 with certain of the actuator components mounted on the mounting surface thereof. More particularly, the substrate 86 is displayed, with the two piezoelectric strips 110a, 110b mounted thereupon. The substrate has three rows of ports 88, 90,92 (each row extending in the array direction 101) formed therein, which correspond respectively to the three manifold chambers 210, 220, 230. Thus, the design of substrate 86 may be considered somewhat similar to that shown in FIG. 5.

FIG. 20 shows the assembly of FIG. 19, with the spacer component 410 mounted thereupon. As discussed above with regard to FIG. 12, the spacer component 410 provides an attachment surface that extends around the piezoelectric strips 110a, 110b and normal to the deposition direction 101; the nozzle plate 430 may then be bonded to this attachment surface so as to enclose the channels formed in piezoelectric strips 110a, 110b, thus providing an array of elongate fluid chambers. Viewed from the mounting surface side of the manifold component 201, the spacer component 410 is shaped so as to surround the piezoelectric strips 110a, 110b.

FIG. 21 shows a partially exploded perspective view of the manifold component 201 and other components making up the completed printhead. In particular, the figure shows the manifold component 201 with two side covers 202 attached (though only one is visible from the angle at which FIG. 21 is taken) to each longitudinal side of the manifold component 201.

As is apparent from FIG. 21, a heat-sink 204 is mounted on the opposite side of the manifold component 201 to the actuator components. The heat sink 204 is shaped so as to engage around this opposing side of the manifold component 201 and down the two longitudinal sides. The heat sink may be in thermal contact (which term is distinct from, and does not necessarily imply, physical contact) with the outwardly facing side surfaces of the longitudinal sides of the manifold component 201, including outwardly facing side surfaces adjacent the left-hand 210 and right-hand 230 manifold chambers and outwardly facing side surfaces of the left-hand 213 and right-hand 233 ribs.

Such outwardly facing surfaces may extend in both the array direction 101 and the deposition direction 102 so that a large area may be available for heat exchange without increasing the footprint of the overall construction over the substrate. In addition, where the cross-sectional shape of the ribs 213, 223, 233 taken perpendicular to the array direction 101 is elongate in the deposition direction, as shown in FIG. 12, the available surface area for thermal conduction with the heat-sink 204 may be particularly large.

More particularly, the outwardly facing side surfaces of the manifold component 201 may be described as being generally normal to the manifold width direction 103. It should be appreciated that "generally normal" implies a reasonable amount of flexibility in the inclination of the side surfaces. A variety of arrangements may be suitable to achieve an appreciable increase in the area available for heat exchange without significantly increasing the footprint over the substrate. For example, such outwardly facing side surfaces may be oriented such that said deposition direction 102 subtends an angle of up to 20 degrees, though in most cases angles of up to 15 degrees or up to 10 degrees may be more appropriate.

Further, as shown in FIG. 12, for example, the side surfaces need not be entirely planar. However, averaged over the whole of the side surface, the normal direction will typically not differ from the manifold width direction 103 by more than 20 degrees, and in many cases a difference of less than 15 degrees or 10 degrees may be more appropriate.

As also shown in FIG. 12 the side surface adjacent the left-hand manifold chamber 210 may co-extend generally parallel to a corresponding interior surface of the left-hand manifold chamber 210. Similarly, the side surface adjacent the right-hand manifold chamber 230 may co-extend generally parallel to a corresponding interior surface of the right-hand manifold chamber 230. As apparent from FIG. 12, the side surface and corresponding interior surface may together define part of a wall enclosing a longitudinal side of that manifold chamber. The interior surface of the manifold chamber may therefore generally oppose the adjacent side surface.

Moreover, it should be appreciated that, particularly where the manifold component 201 is molded, some amount of inclination with respect to the deposition direction 102 may be beneficial. Such inclination may, for example, assist in the removal of the manifold component 201 from a mould, where formed by a molding process such as injection molding.

Mounted upon the heat-sink are circuit boards 360, which may include drive circuitry for supplying electrical actuating signals to the piezoelectric actuator elements of the two arrays of fluid chambers. In use, the heat-sink 204 may conduct heat away from the circuit boards including the drive circuitry 360 and may transfer this heat via the outwardly facing surfaces of the manifold component 201 discussed above to the fluid within the left-hand and right-hand manifold chambers 210, 230. Particularly where the printhead is connected so that these chambers 210, 230 are outlet manifolds, this may allow the flow of fluid through the printhead to draw heat away from the drive circuitry.

The heat-sink 204 may be loosely attached to the manifold component 201, such that it substantially does not transfer mechanical stress to the manifold component 201 during use. Accordingly, the heat-sink 204 may, when attached, be moveable with respect to the manifold component 201 by an amount greater than the amount of thermal expansion that the heat-sink may undergo during use of the printhead. For example, the heat-sink 204 may be moveable relative to the manifold component 201 by an amount of the order of 1 mm (or in some cases 0.1 mm). More specifically, there may be small air gap between the heat sink 204 and the manifold component 201, it being understood that the smaller this air gap is, the more efficient the thermal contact between the components will be. As noted above, the heat-sink 204 may attach to the manifold component 201 by inserting heatsink engaging portions 2014a, 2014b provided by the manifold component into corresponding apertures in the heatsink 204, with the heatsink engaging portions 2014a, 2014b snapping over integrally-formed rib or ridge provided by the heatsink 204.

As also shown in FIG. 21, a generally planar gasket 203, through which ink supply pipes 280, 290 extend, is mounted over the heat-sink 204. A thermal pad 205 is also provided. Top cover 207 is then attached, by means of fixing screws 206, to the components below so as to enclose the electronics. Ribbon cable 365 extends through the top cover 207 to provide the printhead with data communication capabilities. The respective caps 285, 295 for the two ink supply pipes 280, 290 (discussed above) are shown removed in FIG. 21.

While the foregoing embodiments have concerned an inkjet printhead, as noted above, a variety of alternative fluids may be deposited by droplet deposition apparatus. Thus, where reference is made above to an inkjet printhead this should be understood only as giving a particular example of a droplet deposition apparatus.

The invention claimed is:

1. Droplet deposition apparatus comprising an integrally-formed manifold component and one or more actuator components;
   wherein said one or more actuator components provide a first array of fluid chambers, each having a piezoelectric actuator element and a nozzle, said piezoelectric actuator element being operable to cause the release in a deposition direction of fluid droplets through said nozzle in response to electrical signals, said first array of fluid chambers extending in an array direction from a first longitudinal end to a second, opposite longitudinal end, said array direction being generally perpendicular to said deposition direction;
   wherein the manifold component is elongate in said array direction and comprises a first manifold chamber and a second manifold chamber, said first and second manifold chambers extending side-by-side in said array direction and said first manifold chamber being fluidically connected to said second manifold chamber via each of said fluid chambers in said first array;
   wherein the cross-sectional area of at least one of said first manifold chamber and said second manifold chamber tapers with distance in the array direction;
   and wherein the cross-sectional shape of said manifold component perpendicular to said array direction varies with distance in the array direction such that the centroid of the cross-section remains a substantially constant distance, in said deposition direction, from said array of fluid chambers over the length of the first array of fluid chambers.

2. Apparatus according to claim 1, wherein the distance, in said deposition direction, between the centroid of said cross-section of the manifold component and the first array of fluid chambers varies by no more than 10% over the length of the first array of fluid chambers.

3. Apparatus according to claim 1, wherein the cross-sectional shape of said manifold component perpendicular to said array direction varies with distance in the array direction such that the centroid of the cross-section remains at substantially the same location over the length of the first array of fluid chambers with respect to a manifold width direction, which is normal to said deposition direction and said deposition direction.

4. Apparatus according to claim 1, wherein said one or more actuator components further provide a second array of fluid chambers, each having a piezoelectric actuator element and a nozzle, said piezoelectric actuator element being operable to cause the release in said deposition direction of fluid droplets through said nozzle in response to electrical signals, said second array of fluid chambers extending side-by-side with said first array of fluid chambers in said array direction from a first longitudinal end to a second, opposite longitudinal end; and
   further comprising a third manifold chamber that extends side-by-side in said array direction with said first manifold chamber, and wherein said first manifold chamber is fluidically connected to said third manifold chamber via each of said fluid chambers in said second array.

5. Apparatus according to claim 1, wherein said manifold component is substantially symmetric about a plane defined by said array and deposition directions.

6. Apparatus according to claim 1, wherein, with respect to said array direction, said first and second manifold chambers each extend beyond both said first and second longitudinal ends of said first array of fluid chambers.

7. Apparatus according to claim 4, wherein, with respect to said array direction, all of said manifold chambers extend beyond the respective first and second longitudinal ends of both said first and second arrays of fluid chambers.

8. Apparatus according to claim 7, wherein, with respect to said array direction, the centers of said manifold chambers and said array(s) of fluid chambers are generally aligned.

9. Apparatus according claim 4, further comprising a fluid junction where a first conduit branches into second and third conduits, said second and third conduits being connected respectively to said second and third manifold chambers, wherein said conduits are provided substantially by said manifold component.

10. Apparatus according to claim 9, wherein, when viewed in said deposition direction, at least a portion of said fluid junction overlaps with said first manifold chamber and wherein said conduits and said junction are generally located, with respect to said array direction, beyond a longitudinal end of said first and second arrays of fluid chambers.

11. Apparatus according to claim 1, wherein, so as to provide the taper of said at least one of said first manifold chamber and said second manifold chamber, the height in said deposition direction is varied with distance in the array direction.

12. Apparatus according to claim 1, further comprising:
   a heatsink, the heatsink being shaped so as to engage around the opposing side of the manifold component to said actuator components, wherein said heatsink engages loosely with said manifold component such that it substantially does not transfer mechanical stress to the manifold component during use; and
   drive circuitry for supplying drive signals to said piezoelectric actuator elements, said heatsink also being in thermal contact with said drive circuitry.

13. Apparatus according to claim 12, wherein said heatsink is in thermal contact with one or more side surfaces presented by said manifold component, said side surfaces extending in said array direction and said deposition direction wherein one or more of said side surfaces is located adjacent a corresponding one of said manifold chambers.

14. Apparatus according to claim 1, wherein the cross-sectional shape, taken perpendicular to said array direction, of at least one said manifold chambers is generally elongate in said deposition direction.

15. Apparatus according to claim 1, wherein said manifold component includes one or more ribs, said ribs being located above said manifold chambers on the opposite side of said manifold component to said actuator components, wherein respective ribs are provided for each of said manifold chambers; and wherein the height of said ribs in the deposition direction tapers with distance in the array direction, this taper counteracting the taper of the cross-sectional area of the manifold chambers such that the centroid of the cross-section remains a substantially constant distance, in said deposition direction, from said array of fluid chambers over the length of the first array of fluid chambers.

16. Apparatus according to claim 15, further comprising:

a heatsink, the heatsink being shaped so as to engage around the opposing side of the manifold component to said actuator components, wherein said heatsink engages loosely with said manifold component such that it substantially does not transfer mechanical stress to the manifold component during use; and drive circuitry for supplying drive signals to said piezoelectric actuator elements, said heatsink being in thermal contact with with a side surface of at least one of said ribs that extends in said array direction and said deposition direction.

17. Apparatus according claim 1, wherein said manifold component is formed substantially of a polymeric material.

18. Apparatus according claim 1, wherein said manifold is formed by injection molding.

\* \* \* \* \*